United States Patent
Pasanen et al.

(10) Patent No.: US 7,583,745 B2
(45) Date of Patent: Sep. 1, 2009

(54) EXPLOITING SELECTION DIVERSITY IN COMMUNICATIONS SYSTEMS WITH NON-ORTHONORMAL MATRIX AND VECTOR MODULATION

(75) Inventors: Pirjo Pasanen, Vantaa (FI); Olav Tirkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 10/581,509

(22) PCT Filed: Dec. 3, 2003

(86) PCT No.: PCT/IB03/05587

§ 371 (c)(1),
(2), (4) Date: Jun. 1, 2006

(87) PCT Pub. No.: WO2005/055507

PCT Pub. Date: Jun. 16, 2005

(65) Prior Publication Data

US 2007/0109954 A1  May 17, 2007

(51) Int. Cl.
*H04L 1/02* (2006.01)

(52) U.S. Cl. .................... 375/267; 375/141; 375/146; 375/299; 370/230; 370/431; 370/465; 455/452.2; 455/101; 455/103

(58) Field of Classification Search .............. 375/140, 375/141, 146, 267, 295, 299; 370/229–231, 370/431, 436, 441, 462–465, 468, 478–780; 455/450, 452.1, 452.2, 63.3, 101, 103, 115.1, 455/115.3, 115.4, 53.1
See application file for complete search history.

(56) References Cited

U.S. PATENT DOCUMENTS

| 7,047,016 | B2 * | 5/2006 | Walton et al. ............ 455/452.1 |
| 7,260,077 | B2 * | 8/2007 | Wu et al. .................... 370/337 |
| 7,336,956 | B2 * | 2/2008 | Halonen et al. ............. 455/450 |

(Continued)

FOREIGN PATENT DOCUMENTS

WO  WO 03041300  5/2003

(Continued)

OTHER PUBLICATIONS

"On the performance of scheduling over space-time architectures;" R. Gozali, et al; 2002 IEEE 56th Vehicular Technology Conference Proceedings; Sep. 24-28, 2002; pp. 415-419.

(Continued)

*Primary Examiner*—Dac V Ha
(74) *Attorney, Agent, or Firm*—Alfred A. Fressola; Ware, Fressola, Van Der Sluys & Adolphson LLP

(57) ABSTRACT

The invention relates to methods for scheduling at least one out of K transmission channels k with respective $N_{t,k}$ transmission interfaces and respective $N_{r,k}$ reception interfaces for the transmission of data symbols that are matrix or vector modulated, the method comprising calculating a respective Channel Quality Indicator (CQI) $q_k$ for at least one of the K transmission channels, and scheduling at least one of the K transmission channels for the transmission of the matrix or vector modulated data symbols, wherein the scheduling is at least partially based on the calculated CQIs $q_k$. The invention further relates to devices, transmitting stations, wireless communication systems, computer programs and computer program products.

30 Claims, 9 Drawing Sheets

U.S. PATENT DOCUMENTS

| | | | |
|---|---|---|---|
| 7,349,338 B2* | 3/2008 | Balachandran et al. | 370/232 |
| 7,412,212 B2* | 8/2008 | Hottinen | 455/101 |
| 2002/0177447 A1 | 11/2002 | Howard et al. | |

FOREIGN PATENT DOCUMENTS

WO     WO 03081938     10/2003

OTHER PUBLICATIONS

"The impact of multiuser diversity on space-time block coding;" R. Gozali, et al; IEEE Communications Letters, May 2003; vol. 7, No. 5, pp. 213-215.

"On transmit diversity and scheduling in wireless packet data;" A. Kogiantis et al; IEEE 2001.

"Multi-antenna Tranceiver Techniques for 3G and Beyond;" A. Hottinen et al; 2003.

\* cited by examiner

| modulation | calculation method | $R_k$ multipls | adds | det $R_k$ multipls | adds |
|---|---|---|---|---|---|
| ABBA | direct | 128 Cx | 112 C+ | 40 Cx | 30 C+ |
|  | proposed | 12 Cx | 10 C+ | 3 Rx | 1 R+ |
| DABBA | direct | 512 Cx | 448 C+ | 79176 Cx | 18880 C+ |
|  | proposed | 20 Cx | 12 R+ and 3 C+ | 7 Rx | 3 R+ |
| TSTTD | direct | 64 Cx | 48 C+ | 40 Cx | 30 C+ |
|  | proposed | 6 Cx | 2 R+ and 1 C+ | total $R_k$ and det $R_k$ 3 Cx | 1 C+ |

Fig.3

- ●— no scheduling
- ×— CQI $q_K = \det R_k$
- ■— CQI $q_k = \operatorname{tr} R_k$
- ♦— CQI $q_k = \det H_k^H H_k$

EXPLOITING SELECTION DIVERSITY IN COMMUNICATIONS SYSTEMS WITH NON-ORTHONORMAL MATRIX AND VECTOR MODULATION

CROSS REFERENCE TO RELATED APPLICATIONS

This application is for entry into the U.S. national phase under §371 for International Application No. PCT/IB03/005587 having an international filing date of Dec. 3, 2003, and from which priority is claimed under all applicable sections of Title 35 of the United States Code including, but not limited to, Sections 120, 363 and 365(c).

FIELD OF THE INVENTION

The invention relates to a method for scheduling at least one out of K transmission channels k with respective $N_{t,k}$ transmission interfaces and respective $N_{r,k}$ reception interfaces for the transmission of data symbols modulated according to a non-orthonormal matrix or vector modulation.

BACKGROUND OF THE INVENTION

In the context of a wireless communication system, as for instance the Universal Mobile Telecommunications System (UMTS), scheduling can be formulated in terms of a preference function $f_k$ that is calculated for at least one transmission channel out of k=1, . . . ,K transmission channels for a block of substantially orthogonal resources (e.g. frequency, subcarriers, spreading codes, time slots, spatial/polarization eigenmodes) to be scheduled simultaneously. The transmission channel or channels that have the largest value of $f_k$, or a value of $f_k$ that is above some pre-defined limit are used for transmitting data using the scheduled resources. In this context, a transmission channel k may for instance describe the physical propagation channel between a single- or multi-antenna transmitter and a single- or multi-antenna receiver. There may be only one or several transmitters, and, correspondingly, there may be one or several receivers. Said transmitters and receivers may represent base stations, mobile stations or relay stations of a wireless communication system. A transmission channel k can be defined for both the up- and and downlink. A transmission channel k may further relate to a channel between only a sub-group of transmit antenna elements of a multi-antenna transmitter and a single- or multi-antenna receiver, or to a channel between a single or multi-antenna transmitter and a sub-group of antenna elements of a receiver.

The preference function $f_k$ for a transmission channel k may be of the form:

$$f_k = f(u, d_k, z_k, h_k, c_k, CQIm_k, CQIe_k, CQIS_k, \ldots)$$

Here, u is a parameter that describes the general status of the transmission queue, and the remaining parameters are specific for the transmission channel k=1, . . . ,K. Thus $d_k$ is the delay experienced by transmission channel k, i.e. the time that the next packet for/from transmission channel k has spent in the queue, $z_k$ is the size of the next packet scheduled for her (or scheduled by her for transmission, in uplink operation), $h_k$ describes the history, taking into account the amount of data transmitted via transmission channel k during the immediate past, and $c_k$ is her possible priority class, possibly based on the type of subscription or terminal, and/or the type of data. The link-specific Channel Quality Indicators (CQI) that scheduling may be based on, are $CQIm_k$, which determines the transmission mode of transmission channel k. The mode selection may be based on side information, based on measurements at the transmitter, or feedback from a receiver. In particular, $CQIm_k$ determines the rate of transmission channel k, and possibly the used feedback-based beamforming, the Adaptive Space-Time Modulation scheme chosen (matrix/vector modulation, space-time coding), the rate of the concatenated channel code, and/or the modulation alphabets.

$CQIe_k$, which indicates the expected error rate of the transmission mode indicated by $CQIm_k$, and $CQIs_k$, which indicates the speed of transmission channel k, i.e. the channel coherence time.

Based on these parameters (or a subset of them), a scheduler can decide which transmission channel is suited for data transmission, taking into account overall throughput, fairness, delays etc., when applicable. The parts of $f_k$ that do not depend on the radio link are the domain of higher layer protocols. The CQIs, however, are in intimate relationship to the physical layer, and are to be designed in accordance to the physical layer algorithms.

When considering the physical layer, the preference functions $f_k$ may be used in order to minimize the transmission power, maximize the rate, or optimize performance. Often, the physical and higher layer algorithms involve an automatic retransmission request (ARQ) protocol. In these cases, maximizing system capacity typically requires that the frame or block error rate is close to a given optimal value. Thus the preference functions $f_k$ may be used to choose the transmission channel that provides the highest rate with the maximum allowed transmission power, reaching a target error performance.

If scheduling is based on $CQIe_k$, i.e. CQIs that correlate with the expected error performance, the most clear cut way to measure the performance of scheduling is to measure the performance of selection diversity. This means that a number K of transmission channels are considered that have some type of channel statistics. Due to this statistical nature of the K transmission channels, scheduling for example one specific transmission channel out of the K transmission channels that actually has the optimum transmission channel characteristics, for instance the lowest fading or path loss, for data transmission achieves superior performance as compared to transmitting on an arbitrarily chosen transmission channel. Thus, as multi-user diversity is available to a transceiver in a communication system with multiple users to receive or transmit signals, or antenna diversity is available to a receiver that deploys multiple antenna elements to receive a signal that has been transmitted by a transmitter using only a subset of the multiple receiver elements or to transmit a signal using only a subset of the multiple transmitter elements, or frequency diversity is available when a signal is transmitted at different portions of the available channel bandwidth, selection diversity is available for the scheduler when it is offered the degree of freedom to choose from a variety of transmission channels between different transceivers or their elements.

For optimal performance of selection diversity, the transmission channel with the lowest predicted bit error rate (BER) may be scheduled for transmission. This results in a decreased average error rate. However, for a Multiple-Input-Multiple-Output (MIMO) channel, scheduling based on direct evaluation of BER requires heavy computation.

Prior art document "On transmit diversity and scheduling in wireless packet data" by A. G. Kogiantis, N. Joshi, and O. Sunay, published in IEEEcomm, June 2001, vol. 8, pp. 2433-

2437, discloses scheduling in a Multiple-Input-Single-Output (MISO) channel, wherein, among others, an orthonormal diversity transmission scheme (Space-Time Transmit Diversity, STTD) is compared to a single-antenna transmission scheme without diversity. In both schemes, a transmitter (either with two transmit antennas and STTD or with a single antenna) schedules one out of K transmission channels, wherein each respective transmission channel is defined by the physical propagation channel between the two or one transmit antennas at the transmitter and the single antenna at the respective receiver, for a data transmission, wherein scheduling is based on the maximum Carrier-to-Interference power ratio (C/I) for each transmission channel.

The STTD scheme as deployed in the Kogiantis reference can be considered as a matrix modulation scheme, which may be defined as a mapping of modulation symbols onto non-orthogonal spatial resources and orthogonal resources, as for instance time slots or symbol periods, frequency carriers, orthogonal codes, etc., or any combination of these.

In matrix modulation schemes, diversity may be applied. For instance, in a space-time matrix modulation scheme, at least one of said modulation symbols may be mapped to a first antenna element in a first symbol period and to a second antenna element in a second symbol period. Similarly, in a space-frequency matrix modulation scheme, at least one of said modulation symbols may be mapped to a first antenna element and transmitted with a first carrier frequency and to a second antenna element and transmitted with a second carrier frequency.

If modulation symbols are mapped to the non-orthogonal spatial resources only, so-called vector modulation is performed, and only spatial diversity is available.

In the sequel of this introduction, space-time matrix modulation methods will be presented as an example of orthonormal and non-orthonormal matrix modulation methods. The orthogonal resource is then represented by the T symbol periods (or time slots) to which a block of data symbols is mapped. However, the presented matrix modulation methods are readily applicable to matrix modulation that employs the frequency domain, the code domain, the eigenmode domain or polarization domain as orthogonal resource instead of the time domain.

A space-time matrix modulator employing $N_t$ transmit antennas and T symbol periods is defined by a $TXN_t$ modulation matrix X. The modulation matrix X is a linear function of the Q complex-valued modulation symbols $x_n$, n=1, . . . ,Q to be transmitted by the $N_t$-antenna transmitter during T symbol periods. Modulation symbols may for instance obey the Binary Phase Shift Keying (BPSK), Quaternary Phase Shift Keying (QPSK) or Quadrature Amplitude Modulation (QAM) symbol alphabet. The modulation matrix X thus basically defines when modulation symbols $x_n$, with n=1, . . . ,Q and/or functions of said modulations symbols $x_n$ such as $-x_n$, $x_n^+$ or $-x_n^+$ are transmitted from which transmit antenna $n_t=1, \ldots, N_t$ at which time instance $t=1, \ldots, T$. In this context, the superscript operator "*" denotes the conjugate-complex of a complex number. The matrix modulation then can be understood as a mapping of modulation symbols and functions thereof to $N_t$ respective data streams that are transmitted by $N_t$ respective transmit antenna elements of a transmit antenna during T symbol periods. For the STTD scheme as applied in the Kogiantis reference, the modulation matrix X is defined according to the so-called Alamouti Space-Time code with T-2 and $N_t$=2 as $$X = \begin{bmatrix} x_1 & x_2 \\ -x_2^* & x_1^* \end{bmatrix}. \quad (1)$$

With $N_{k,r}$ receive antennas at the reception side of the transmission channel k, the signal model reads as:

$$Y_k = X \cdot H_k + N_k, \quad (2)$$

wherein $Y_k$ is a $TXN_{k,r}$ matrix of signals $y_{k,ij}$ received at receive antenna element j=1, . . . ,$N_{k,r}$ during symbol period i=1, . . . ,T, wherein the elements $h_{k,ij}$ with i=1, . . . ,$N_t$ and j=1, . . . ,$N_{k,r}$ of the $N_t X N_{k,r}$ channel matrix $H_k$ define the flat fading propagation channel between transmit antenna element i and receive antenna element j, and wherein the $TXN_{k,r}$ matrix $N_{k,r}$ represents the noise received in symbol period t=1, . . . ,T at receive antenna element $n_k$=1, . . . ,$N_{k,r}$.

Lumping together the effects of matrix modulation as defined by the matrix X and the propagation effects as defined by the channel matrix $H_k$ yields a complex-valued $TN_{k,r}XQ$ equivalent channel matrix $G_k$ with an equivalent signal model:

$$y_k = G_k \cdot x + n_k, \quad (3)$$

wherein the $TN_{k,r}$-dimensional vector $y_k$ contains the signals received during T symbol periods at the $N_{k,r}$ receive antenna elements at the reception side of transmission channel k, or functions thereof such as the conjugate-complex receive signal, the negative receive signal or the negative conjugate-complex receive signal; the Q-dimensional vector x contains the Q complex-valued modulation symbols $x_n$, n=1, . . . ,Q that are modulated by the matrix modulation onto $N_t$ transmit antenna elements in T symbol periods; and the $TN_{k,r}$-dimensional vector $n_k$ contains the noise received at the receive antenna elements during the T symbol periods.

For the STTD scheme, the equivalent channel matrix $G_k$ has the following shape:

$$G_k = \begin{bmatrix} h_{k,11} & h_{k,21} \\ h_{k,21}^* & -h_{k,11}^* \end{bmatrix}, \quad (4)$$

and the equivalent system model reads as $$\begin{pmatrix} y_{k,11} \\ y_{k,21}^* \end{pmatrix} = \begin{bmatrix} h_{k,11} & h_{k,21} \\ h_{k,21}^* & -h_{k,11}^* \end{bmatrix} \cdot \begin{pmatrix} x_1 \\ x_2 \end{pmatrix} + \begin{pmatrix} n_{k,11} \\ n_{k,21} \end{pmatrix}. \quad (5)$$

It is readily seen from equation (5) that both the effects of matrix modulation and channel propagation are now contained in the equivalent channel matrix $G_k$, so that in the equivalent signal model of equation (5), the original modulation symbols $x_n$ and not functions of the modulation symbols $x_n$ are multiplied with the equivalent channel matrix $G_k$. With the equivalent channel matrix $G_k$, the Equivalent Channel Correlation Matrix (ECCM) $R_k$ can be defined as $$R_k = G_k^H \cdot G_k, \quad (6)$$

wherein the superscript operator "H" denotes the Hermitian conjugate of a matrix.

For the STTD scheme, it is easily seen that the ECCM is a diagonal matrix with $$R_{k,STTD} = \begin{bmatrix} |h_{k,11}|^2 + |h_{k,21}|^2 & 0 \\ 0 & |h_{k,11}|^2 + |h_{k,21}|^2 \end{bmatrix}.$$

The ECCM can be interpreted as applying a matched filter to the equivalent channel matrix $G_k$, so that a matched filer estimate of the vector x that contains the Q modulation symbols $x_n$ with n=1, . . . ,Q is obtained as $$\hat{x} = G_k^H \cdot y_k = R_{k,STTD} \cdot x_k + G_k^H \cdot n_k,$$

When the power of the noise contribution $n_k$ can be neglected as compared to the power of the receive signal $y_k$, the matched filter estimate $\hat{x}$ is basically given by the term $R_{k,STTD} \cdot x_k$, i.e. the matched filter estimates $\hat{x}_n$ are simply the modulation symbols $x_n$ scaled by a real-valued factor $|h_{k,11}|^2 + |h_{k,21}|^2$ that is identified as the sum of the powers of the channels $h_{k,ij}$ between the i=1, . . . ,$N_t$ transmit antennas and the i=1, . . . ,$N_{k,r}$ receive antennas.

The ECCM according to the STTD matrix modulation scheme only has non-zero entries on the main diagonal and thus does not cause self-interference between modulation symbols $x_n$ in the matched filter estimates $\hat{x}_n$. Moreover, the diagonal elements are all equal, thus the ECCM is proportional to the identity matrix. Matrix modulation schemes with ECCM proportional to the identity matrix will be denoted as orthonormal matrix modulation schemes in the sequel, whereas matrix modulation schemes with ECCMs not proportional to the identity matrix will be denoted as non-orthonormal matrix modulation schemes.

FIGS. 1 and 2 show the essential features regarding scheduling in a selection diversity setting with STTD as disclosed in the Kogiantis reference. In particular, scheduling performance is investigated with orthonormal matrix modulation (STTD, $N_t$=2) and without matrix modulation ($N_t$=1) for $N_{k,r}$=1 and different numbers of transmission channels K, wherein the selection of a transmission channel for a data transmission is based on the maximum C/I at the reception side of that transmission channel.

FIG. 1 shows the scheduling performance in terms of $\log_{10}$ (BER) as a function of the ratio $E_b/N_0$ of energy per bit $E_b$ and noise power density $N_0$ (assuming an Additive White Gaussian Noise (AWGN) process at the reception side of the transmission channel) in dB. Results for QPSK modulation and independent identically distributed (i.i.d.) flat Rayleigh-fading channels are depicted in separate figures for K=1, 2, 4 and 8 transmission channels with (dashed line) or without STTD (solid line), respectively.

It is observed that when there are up to K=4 transmission channels, scheduling with STTD outperforms scheduling without transmit diversity, because the (uncoded) BER with STTD is significantly smaller than the (uncoded) BER without STTD across the complete $E_b/N_0$ regime. However, for K=8 transmission channels, scheduling without STTD outperforms STTD-based scheduling up to a BER $10^{-3.}$ In the high $E_b/N_0$ regime, the transmit diversity of STTD still gives better performance.

The reason for this can be seen in FIG. 2, where Probability Distribution Functions (PDFs) of the Signal-to-Noise Ratio (SNR) at the scheduled receiver (with Maximum Ratio Combining (MRC) for STTD) are plotted for i.i.d. Rayleigh fading channels $h_{k,ij}$ with $E\{|h_{k,i1}|^2\}=1$, once again for the cases with (dashed line) and without STTD (solid line) and for different numbers of transmission channels K=1, 2, 4 and 8 among which scheduling is performed. It can be clearly seen from the reduced extension and the pronounced maxima of the PDFs how STTD reduces the fluctuations in channel power. Also, it is evident that STTD is not able to change the average SNR of the channel, it just improves bad channels with the price of making good ones worse. Thus a significant portion of transmission channels, that have a strong channel from one transmit antenna and a weak from the other, have worse received SNR after MRC combining (see FIG. 2, upper left corner). With an increasing number K of transmission channels, a non-STTD transmission can always be scheduled to a transmission channel that would have had a worse channel if STTD was applied. Thus for multiple transmission channels K, scheduling without STTD works better.

The situation regarding combinations of orthonormal matrix modulation (STTD) and scheduling as disclosed in the Kogiantis reference can thus be summarised as:

For more than K=5 transmission channels, orthonormal matrix modulation (STTD) performs worse than a single antenna transmission as a component in a selection diversity scheme with max C/I-based scheduling, at BER $10^{-3}$.

If more than K=3 transmission channels are scheduled simultaneously, STTD and other orthonormal matrix modulations are of no practical use.

SUMMARY OF THE INVENTION

In view of the above-mentioned problems, it is thus an object of the present invention to improve communications systems that perform scheduling in combination with matrix and vector modulation in a selection diversity setting.

It is proposed a method for scheduling at least one out of K transmission channels k=1, . . . ,K with respective $N_{t,k}$ transmission interfaces and respective $N_{r,k}$ reception interfaces for the transmission of data symbols modulated according to a non-orthonormal matrix modulation that modulates data symbols in both a non-orthogonal spatial domain and at least one orthogonal domain, wherein at least one Equivalent Channel Matrix (ECM) $G_k$ can be defined that transforms said data symbols into data symbols that have been matrix modulated, transmitted over $N_{t,k}$ transmission interfaces and received at $N_{r,k}$ reception interfaces of one of said transmission channels k=1, . . . ,K, and wherein an Equivalent Channel Correlation Matrix (ECCM) $R_k = G_k^H \cdot G_k$ of said at least one ECM $G_k$ is not proportional to the identity matrix, said method comprising calculating a respective Channel Quality Indicator (CQI) $q_k$ for at least one of said K transmission channels, and scheduling at least one of said K transmission channels for the transmission of said matrix modulated data symbols, wherein said scheduling is at least partially based on said calculated CQIs $q_k$.

Said transmission channel k may for instance describe the physical propagation channel between a single- or multi-antenna transmitter and a single- or multi-antenna receiver. There may be only one or several transmitters, and, correspondingly, there may be one or several receivers. Said transmitters and receivers may represent base stations, mobile stations or relay stations of a wireless communication system. A transmission channel k may be defined for both the up- and downlink. A transmission channel k may further relate to a channel between only a sub-group of transmit antenna elements of a multi-antenna transmitter and a single- or multi-antenna receiver, or to a channel between a single or multi-antenna transmitter and a sub-group of antenna elements of a receiver.

Data symbols, which may for instance represent BPSK, QPSK or QAM modulation symbols, are matrix modulated and transmitted via said respective transmit interfaces of said transmission channel k. Said matrix modulation represents a mapping of data symbols onto non-orthogonal spatial resources and (substantially) orthogonal resources, as for instance time slots, frequency carriers, orthogonal codes, spatial or polarization eigenmodes, or combination of these etc. Said matrix modulation may be defined by & modulation matrix, that is a linear function of said data symbols that are to be transmitted via the $N_{t,k}$ transmission interfaces of said transmission channel k. For space-time matrix modulation, said modulation matrix may define when data symbols and/or functions of said data symbols are transmitted from which transmit interface in which symbol period. The space-time matrix modulation then can be understood as a mapping of data symbols and functions thereof to $N_t$ respective data streams that are transmitted by $N_t$ respective transmit interfaces during T symbol periods. Similarly, in space-frequency matrix modulation, the modulation matrix defines which symbols are transmitted from which transmit interface with which frequency. Instead of time and frequency, further orthogonal or substantially orthogonal domains may be used, for instance the code domain, polarization domain, eigen-mode domain, etc.

Said transmission of said matrix modulated data symbols over one of said transmission channels k=1, . . . ,K may be defined by a transmission channel-matrix which contains one respective entry to characterise the attenuation and phase shift the data symbols undergo when being transmitted on a respective channel between a transmit interface and a receive interface. Said transmission channel may be a wired or wireless transmission channel.

The effects of said modulation matrix and said transmission channel matrix are combined in said equivalent channel matrix $G_k$, which then describes the matrix modulation of data symbols and the transmission and reception of said matrix modulated data symbols using the transmission channel k between the transmission interfaces and the reception interfaces. Said transmission interfaces of said transmission channel may be connected to one or several transmitters, and, correspondingly, the reception interfaces of said transmission channel may be connected to one or more receivers.

The ECCM $R_k$ of said equivalent channel is not proportional to the identity matrix, so that the matrix modulation scheme is classified as non-orthonormal matrix modulation scheme. Thus when a matched filter is applied at the receiver side of the transmission channel k, the matched filter estimate of the data symbols suffers from self-interference between the data symbols. A non-orthonormal matrix modulation scheme may for instance be constructed by the linear combination of orthonormal matrix modulation techniques such as space-time codes, space-frequency codes or the like.

Scheduling is performed by a scheduling instance at either the transmission side or the reception side of said transmission channel to decide which of the K transmission channels are best suited to be used for transmitting data symbols that are matrix modulated by and subsequently transmitted to the receiver side of the said transmission channel.

Scheduling is at least partially based on CQIs $q_k$ that have been computed for at least one of said K respective transmission channels. In may be preferred that CQIs $g_k$ are computed for at least two of said K respective transmission channels. Then scheduling may be determined by comparison of said CQIs which transmission channel is more suited for transmission of data symbols. Scheduling may also be performed in a way that once the CQI for some transmission channel is above a set limit then that transmission channel is used - therefore in some cases in may be enough to calculate only one CQI.

CQIs may not have to be calculated for all the K transmission channels between which the selection is made: prior knowledge on CQIs of transmission channels or some other means to avoid repeated calculation may be applied also.

The K transmission channels to be selected from may not all use the same modulation, for example some of them may use orthonormal matrix modulations, and others may use non-orthonormal matrix modulation, vector modulation, single antenna transmission or diversity transmission. Correspondingly, the CQIs for the respective transmission channels may be computed in different fashions depending on the modulation technique that is applied for the data symbols that are to be transmitted via said respective transmission channel.

At least one ECM $G_k$ can be defined to describe the non-orthonormal matrix modulation of said data symbols and their transmission over a specific transmission channel, which may be entirely defined by a channel matrix $H_k$. The ECCM $R_k$ of said ECM $G_k$ then is not proportional to the identity matrix, due to the fact that the matrix modulation is non-orthonormal. Said ECCM can then be either a non-diagonal matrix, or a diagonal matrix with unequal entries on the diagonal. The non-diagonality reflects the fact that interference arises between the matrix modulated data symbols that can not simply be removed by matched filtering at the receiving side of the specific transmission channel. If matrix modulation is performed for more than one of the K transmission channels, more than one ECM $G_k$ with a respective ECCM $R_k$ can be defined. However, only the ECCMs $R_k$ of the transmission channels on which non-orthonormal matrix modulation is performed will not be proportional to the identity matrix, whereas the ECCMs of transmission channels that use orthonormal matrix modulation will be proportional to the identity matrix.

Depending on the definition of the transmission channels, scheduling may be applied to select between multiple users in the uplink or downlink of a wireless communication system, or to select between multiple groups of Tx antennas, where matrix modulation is used on the selected subgroup of antennas. Furthermore, if a receiver may be equipped with less RF-circuitry than antenna elements, the receiver may select the best antenna/antennas to receive a transmission with. If the transmitter uses matrix modulation, each possible choice of receive antennas at the receiver is interpreted as a transmission channel according to this invention. The receiver then may choose the (set of) receive antenna(s) based on CQIs disclosed in this invention.

Scheduling may be performed in the time, frequency or code dimension or any combination of these, for example the matrix modulation can be performed in frequency, but the scheduling in both time and freq. For instance, based on said at least one calculated CQI, a scheduler may determine which transmission channel is scheduled for the next time slot, or which transmission channel is scheduled for a sub-carrier, polarization, spatial eigenmode, etc.

Scheduling may be further applied in a handover situation to select between multiple base stations in uplink or downlink transmission. In the downlink, this may require cooperation between multiple base stations.

One or more transmission channels may be scheduled for transmissions of matrix modulated data symbols, simultaneously. On the receiving side of the transmission channel, a receiver may be equipped with one or more receive interfaces and apply receive diversity combining techniques.

Thus in contrast to the prior art approach of performing scheduling in combination with orthonormal matrix modulation in a selection diversity setting, which, for increasing numbers of transmission channels proves to be of inferior performance than scheduling without transmit diversity, according to the present invention, scheduling is performed in combination with non-orthonormal matrix modulation in a selection diversity setting. The non-orthonormal matrix modulation scheme can be considered to introduce additional diversity into the equivalent channels between and thus proves to be superior to both the orthonormal matrix modulation approach and the approach without transmit diversity.

According to the method of the present invention, it may be preferred that said respective CQI $q_k$ is derived for at least one of said K transmission channels from said ECCM $R_k$.

The at least one ECCM $R_k$ corresponding to the at least one ECM $G_k$ contains both the effects of matrix modulation and the transmission channel and is thus especially suited as a basis for scheduling. The equivalent channel matrices $G_k$ are advantageously known by the scheduler when scheduling is performed.

According to the method of the present invention, it is preferred that said respective CQI $g_k$ is calculated for at least one of said K transmission channels as a function of the determinant of a linear function of said ECCM $R_k$.

The determinant of the ECCM $R_k$ has a strong correlation with the BER that is achieved when data symbols are matrix modulated and transmitted via a transmission channel k as prescribed by the equivalent channel matrix $G_k$. Said strong correlation to the BER causes the scheduling to be based on the expected error rate of the transmission and thus allows scheduling to reduce the average error rate in a wireless communication system. The correlation may be even further enhanced by considering the determinant of a constant times the identity matrix plus the ECCM $R_k$, i.e. $\det(aI+R_k)$, and adjusting the constant a according to the used transmission and detection scheme. The constant a may also be chosen equal to zero. Said function of said determinant may for instance be a power or a root of said determinant, or a multiple thereof, or further mathematical functions.

According to the method of the present invention, it may also be preferred that said respective CQI $q_k$ is calculated for at least one of said K transmission channels as a function of the trace of said ECCM $R_k$.

The trace of said ECCM also exhibits a strong correlation with the BER that is achieved when data symbols are matrix modulated and transmitted via a transmission channel k as prescribed by the equivalent channel matrix $G_k$. Furthermore, the computational costs for calculating the trace of an unstructured ECCM $R_k$ are comparatively low.

According to the method of the present invention, it may also be preferred that said respective CQI $g_k$ is calculated for at least one of said K transmission channels as a function of the trace of the inverse of said ECCM $R_k$.

The trace of the inverse of said ECCM also exhibits a strong correlation with the BER that is achieved when data symbols are matrix modulated and transmitted via a transmission channel k as prescribed by the equivalent channel matrix $G_k$.

Alternatively, any combination of the above-mentioned calculation methods for the CQIs, for instance a function of the determinant, the trace or the trace of the inverse of the ECCM, or some other function of the ECCM, may be taken as the CQI. For example, the determinant of the matrix $(aI+\rho R_k)$ can be interpreted in this way, wherein I denotes the identity matrix and a is a constant. This may be expanded in the carrier-to-interference-and-noise power ratio $\rho$, and coefficients of this expansion are the trace of $R_k$, the determinant of $R_k$ and other symmetric polynomials of $R_k$. The constant a may be adjusted according to the used transmission and reception scheme.

According to the method of the present invention, it is preferred that said respective CQI $q_k$ is calculated for at least one of said K transmission channels as a function of the elements of a channel matrix $H_k$, which defines said at least one transmission channel, and wherein said function is derived from said ECCM $R_k$ under exploitation of the structural properties of said ECCM $R_k$.

Said channel matrix $H_k$ defines the physical propagation channel between the respective transmission interfaces and the respective reception interfaces of said at least one transmission channel. Preferably said channel matrix $H_k$ defines the transmission channel for which said at least one ECM $G_k$ can be defined. Said equivalent channel matrix $G_k$ then represents the combination of a modulation matrix and said channel matrix $H_k$. Due to the structure of the modulation matrix, which is inherited by said equivalent channel matrix $G_k$, also the ECCM $R_k$ possesses a structure that can be exploited to save computations when calculating the determinant or trace or other functions of the ECCM $R_k$. In particular, closed-form expressions for the CQIs $q_k$ can be derived that may only depend on single elements of the channel matrix $H_k$. Instead of having to compute the ECCM $R_k$ itself and then to calculate the CQI $q_k$ from said ECCM $R_k$ when calculating the CQI $q_k$ for a transmission channel k during scheduling, only said computationally efficient closed-form expression in the elements of the channel matrix $H_k$ has to be calculated. For preferred embodiments, providing said simple closed-form expressions significantly reduces the complexity of calculating the CQI $q_k$ for matrix modulators down to the 2Q-th root, where Q is the number of data symbols in the matrix modulator.

The structure of the ECCM $R_k$ may equally well be exploited at the receiving side of the transmission channel when estimating the received matrix modulated data symbols by means of equalisation or multi-user detection. In particular, computation of the determinant or the inverse of the ECCM $R_k$ is vastly simplified by exploiting its structure.

It is understood that, if all of the K transmission channels k=1, . . . ,K are suited for the transmission of non-orthonormally matrix modulated data symbols, each of said transmission channels k may be characterized by a respective channel matrix $H_k$, respective ECM $G_k$ and respective ECCM $R_k$, and the respective CQI $q_k$ may then be calculated for each of these K transmission channels from the respective $R_k$ or $H_k$. Scheduling then may be based on the comparison of all of these respective CQIs $q_k$.

According to a first embodiment of the present invention, said non-orthonormal matrix modulation is so-called "ABBA" non-orthonormal matrix modulation that maps a block of 4 data symbols onto $N_{t,k}=4$ transmission interfaces in 4 units of said at least one orthogonal domain and is based on the non-orthonormal combination of two Space-time Transmit Diversity (STTD) codes. Said units of said at least one orthogonal domain may for instance be time slots or frequency sub-carriers, so that said non-orthonormal matrix modulation then becomes a space-time or space-frequency matrix modulation, respectively. An example of an orthonormal STTD code is given by the transpose of the Alamouti code in equation (1).

According to said first preferred embodiment of the present invention, said ECCM $R_k$ is of the form $$R_k = \begin{bmatrix} p_k & 0 & n_k & 0 \\ 0 & p_k & 0 & n_k \\ n_k & 0 & p_k & 0 \\ 0 & n_k & 0 & p_k \end{bmatrix}, \text{ and}$$

$p_k$ and $n_k$ are real-valued functions of the elements of said channel matrix $H_k$.

This structure of the ECCM $R_k$ is for instance encountered in the so-called "ABBA" non-orthonormal matrix modulation scheme. If being applied as space-time matrix modulation, the corresponding modulation matrix contains two STTD blocks $X_A$ and $X_B$ (cf. the transpose of equation (1)) that modulate 4 data symbols onto 4 transmit interfaces during 4 symbol periods, so that in effect 1 symbol is transmitted per symbol period (so-called symbol rate 1 matrix modulation).

According to said first preferred embodiment of the present invention, said respective CQI $q_k$ is preferably calculated for at least one of said K transmission channels as a function of $((a+p_k)^2 - n_k^2)$, and wherein a is a constant value. Said respective CQI $q_k$ thus is efficiently computed from the real-valued functions $p_k$ and $n_k$ that only depend on the elements of said channel matrix $H_k$. The constant a may be adjusted according to the used transmission and reception scheme.

According to a second preferred embodiment of the present invention, said non-orthonormal matrix modulation is a DABBA non-orthonormal matrix modulation that maps a block of 8 data symbols onto $N_{t,k}=4$ transmission interfaces in 4 units of said at least one orthogonal domain and is based on the non-orthonormal combination of four STTD codes. Said units of said at least one orthogonal domain may for instance be time slots or frequency sub-carriers, so that said non-orthonormal matrix modulation then becomes a space-time or space-frequency matrix modulation, respectively. An example of an orthonormal STTD code is given by the transpose of the Alamouti code in equation (1).

According to said second preferred embodiment of the present invention, said ECCM $R_k$ is of the form $$R_k = \begin{bmatrix} p_{k,1}+p_{k,2} & 0 & n_{k,1} & 0 & p_{k,1}-p_{k,2} & 0 & i\cdot n_{k,2} & s_k^* \\ 0 & p_{k,1}+p_{k,2} & 0 & n_{k,1} & 0 & p_{k,1}-p_{k,2} & -s_k & i\cdot n_{k,2} \\ n_{k,1} & 0 & p_{k,1}+p_{k,2} & 0 & i\cdot n_{k,2} & -s_k^* & -p_{k,1}+p_{k,2} & 0 \\ 0 & n_{k,1} & 0 & p_{k,1}+p_{k,2} & s_k & i\cdot n_{k,2} & 0 & -p_{k,1}+p_{k,2} \\ p_{k,1}-p_{k,2} & 0 & i\cdot n_{k,2} & s_k^* & p_{k,1}+p_{k,2} & 0 & n_{k,1} & 0 \\ 0 & p_{k,1}-p_{k,2} & -s_k & i\cdot n_{k,2} & 0 & p_{k,1}+p_{k,2} & 0 & n_{k,1} \\ i\cdot n_{k,2} & -s_k^* & -p_{k,1}+p_{k,2} & 0 & n_{k,1} & 0 & p_{k,1}+p_{k,2} & 0 \\ s & i\cdot n_{k,2} & 0 & -p_{k,1}+p_{k,2} & 0 & n_{k,1} & 0 & p_{k,1}+p_{k,2} \end{bmatrix}$$

wherein $p_{k,1}$, $p_{k,2}$, $n_{k,1}$ and $n_{k,2}$ are real-valued functions of the elements of said channel matrix $H_k$ and wherein $s_k$ is a complex-valued function of the elements of said channel matrix $H_k$. This structure of the ECCM $R_k$ is for instance encountered in the so-called "DABBA" non-orthonormal matrix modulation scheme. If being applied as space-time matrix modulation scheme, the corresponding modulation matrix comprises linear combinations of 4 STTD blocks $X_A$, $X_B$, $X_C$ and $X_D$ and modulates 8 data symbols onto 4 transmit interfaces during 4 symbol periods, so that in effect 2 symbols are transmitted per symbol period (so-called symbol rate 2 matrix modulation).

According to said second preferred embodiment of the present invention, said respective CQI $q_k$ is preferably calculated for at least one of said K transmission channels as a function of $(4\cdot p_{k,1}\cdot p_{k,2}+(p_{k,1}+p_{k,2})(a^2+2\cdot a)+n_{k,1}^2-n_{k,2}^2+|s_k|^2)^4$, and wherein a is a constant value. Said respective CQI $q_k$ thus is efficiently computed from the real-valued functions $p_{k,1}$, $p_{k,2}$, $n_{k,1}$ and $n_{k,2}$ and the complex valued function $s_k$ that only depend on the elements of said channel matrix $H_k$. The constant a may be adjusted according to the used transmission and reception scheme.

According to a third preferred embodiment of the present invention, said non-orthonormal matrix modulation is a TSTTD non-orthonormal matrix modulation that maps a block of 4 data symbols onto $N_{t,k}=2$ transmission interfaces in 2 units of said at least one orthogonal domain and is based on the non-orthonormal combination of two STTD codes.

Said units of said at least one orthogonal domain may for instance be time slots or frequency sub-carriers, so that said non-orthonormal matrix modulation then becomes a space-time or space-frequency matrix modulation, respectively. An example of an orthonormal STTD code is given by the transpose of the Alamouti code in equation (1).

According to said third preferred embodiment of the present invention, said ECCM $R_k$ is of the form $$R_k = \begin{bmatrix} p_{k,1}+p_{k,2} & 0 & p_{k,1}-p_{k,2} & s_k \\ 0 & p_{k,1}+p_{k,2} & s_k^* & p_{k,2}-p_{k,1} \\ p_{k,1}-p_{k,2} & s_k & p_{k,1}+p_{k,2} & 0 \\ s_k^* & p_{k,2}-p_{k,1} & 0 & p_{k,1}+p_{k,2} \end{bmatrix},$$

wherein $p_{k,1}$ and $p_{k,2}$ are real-valued functions of the elements of said channel matrix $H_k$ and wherein $s_k$ is a complex-valued function of the elements of said channel matrix $H_k$. This structure of the ECCM $R_k$ is for instance encountered in the so-called "Twisted or Twice STTD (TSTTD)" non-orthonormal matrix modulation scheme. If being applied as a space-time matrix modulation, the corresponding modulation matrix is represented by the sum of a STTD block $X_A$ and a STTD block $X_B$ (cf. the transpose of equation (1)) that modulates 4 data symbols onto 2 transmit interfaces during 2 symbol periods, so that in effect 2 symbols are transmitted per symbol period (so-called rate 2 matrix modulation).

According to the third preferred embodiment of the present invention, said respective CQI $q_k$ is preferably calculated for at least one of said K transmission channels as a function of (det(aI+$H_k^H H_k$)), and wherein a is a constant value. The respective CQI $q_k$ thus can be directly determined from the transmission channel matrix $H_k$ without requiring the actual computation of the ECCM $R_k$. The constant a may be adjusted according to the used transmission and reception scheme.

According to the method of the present invention, it may be preferred that said non-orthonormal matrix modulation is a DSTTD non-orthonormal matrix modulation that maps a block of 4 data symbols onto $N_{t,k}$=4 transmission interfaces in 2 units of said at least one orthogonal domain and is based on the non-orthonormal combination of two STTD codes.

Said units of said at least one orthogonal domain may for instance be time slots or frequency sub-carriers, so that said non-orthonormal matrix modulation then becomes a space-time or space-frequency matrix modulation, respectively. An example of an orthonormal STTD code is given by the transpose of the Alamouti code in equation (1).

According to the method of the present invention, it is preferred that said non-orthonormal matrix modulation comprises space-time or space-frequency coding. The modulation matrix of said matrix modulation may for instance represent a linear combination of STTD blocks, or may contain STTD blocks or linear combinations or functions thereof as sub-matrices.

According to the method of the present invention, it is preferred that said non-orthonormal matrix modulation comprises a combination of at least two orthonormal matrix modulations. For instance, a modulation matrix that defines said matrix modulation may be the sum of two orthonormal STTD blocks, so that a rate 2 non-orthonormal matrix modulation is obtained instead of a rate 1 orthonormal matrix modulation as represented by a STTD block.

It is further proposed a method for scheduling at least one out of K transmission channels k=1, . . . ,K with respective $N_{t,k}$ transmission interfaces and respective $N_{r,k}$ reception interfaces for the transmission of data symbols, wherein at least two of said data symbols are transmitted in parallel from $N_{t,k}$ transmission interfaces of at least one of said K transmission channels, which is defined by a channel matrix $H_k$, said method comprising calculating a respective Channel Quality Indicator (CQI) $q_k$ for at least one of said K transmission channels, wherein at least one of said respective CQIs $q_k$ is calculated as a function of the determinant of a a linear function of the channel correlation matrix $H_k^H \cdot H_k$ of said channel matrix $H_k$, and scheduling at least one of said K transmission channels for the transmission of said data symbols, wherein said scheduling is at least partially based on said calculated CQIs $q_k$.

At least two of said data symbols are transmitted from said respective $N_{t,k}$ transmission interfaces in parallel, for instance one data symbol may be transmitted from a first transmission interface and a second data symbol from a second transmission interface. If said transmission interfaces are the antenna elements of a transmitter, said two data symbols cause interference to each other when being received at the reception interfaces of a transmission channel k. Transmitting said at least two data symbols in parallel may be considered as a vector modulation scheme, wherein data symbols are mapped to a non-orthogonal spatial resource. A representative of such as vector modulation scheme is the Bell Laboratories Layered Space Time Architecture (BLAST). In contrast to matrix modulation schemes, diversity is only used in the spatial domain without exploiting orthogonal domains as for instance the time, frequency or polarization domain.

The determinant of said matrix aI+$H_k^H H_k$ or other functions thereof exhibits a strong correlation with the BER that is achieved when data symbols are transmitted from a transmitter using the transmission channel k as prescribed by the channel matrix $H_k$.

With respect to the interpretation of the transmission channels and the scheduling scenarios, the above description of the types of transmission channels and scheduling scenarios for the matrix modulation applies for the vector modulation as well.

According to the method of the present invention, it is preferred that at least one receiver uses a Maximum Likelihood algorithm or a linear estimator to estimate said data symbols that are transmitted over said scheduled transmission channel and received by said receiver via said reception interfaces of said scheduled transmission channel.

Due to the use of a non-orthonormal matrix or vector modulation scheme, an estimate for the data symbols that is based on matched filtering of the matrix/vector modulated, transmitted and received data symbols may contain self-interference to a degree that renders the correct estimation of the data symbols impossible. It is then advantageous to perform maximum likelihood or reduced complexity linear equalisation techniques such as for instance a zero-forcing algorithm or a minimum mean-square error algorithm. Both approaches may advantageously be based on a sufficient set of statistics that is obtained by matched filtering of the data symbols received via the reception interfaces of said transmission channel.

According to the method of the present invention, it may be preferred that a transmission channel k=1, . . . ,K with the largest CQI $q_k$ is scheduled for said transmission of said data symbols.

In particular if all K transmission channels employ the same matrix modulation, it is preferred that the transmission channel k=1, . . . ,K with the largest CQI $q_k$ is scheduled. The BER is approximated closely by a strictly monotonic decreasing function of the determinant of a linear function of the ECCM $R_k$ and the trace of the ECCM $R_k$. The lowest BER, or lowest power consumption when the target BER is fixed, thus is achieved when transmitting data via the transmission channel with the largest CQI $q_k$. Alternatively one may want to minimize the used transmission power for an expected error probability. This is performed in a similar way using the same CQI $q_k$.

If different transmission channels employ different matrix modulations, possibly with different rates, the calculated $CQIe_k$, characterizing the error probabilities of the transmission channels, together with the rates and modulation types characterized by $CQIm_k$, are used to select the transmission channel that provides the highest rate with a given power and expected error probability, or the transmission channel with provides the lowest error probability with an expected rate and given power, or the transmission channel that uses the least power to reach an expected error probability with an expected rate. To achieve this, the error probabilities for each transmission mode can be approximated for example in a log-log scale as linear functions of the $CQIe_k$, with suitable parameters to give the best fit. The approximate functions are quite accurate and can be used to find solutions to the minimization problems.

According to the method of the present invention, it may be preferred that said transmission channels are transmission channels of a wireless communication system, and that said transmission and reception interfaces of said transmission channels are the transmit and receive antenna elements of one or several transmitters and one or several receivers, respectively.

Said wireless communication system may for instance be the Universal Mobile Telecommunications System (UMTS), the Global System for Mobile Communications (GSM), or a system according to the Interim Standard 95 (IS-95). Alternatively, it may be a Wireless Local Area Network (W-LAN) system like the HIPERLAN/2 or 802.11 system.

It is further proposed a computer program with instructions operable to cause a processor to perform the above-mentioned method steps.

It is further proposed a computer program product comprising a computer program with instructions operable to cause a processor to perform the above-mentioned method steps.

It is further proposed a device for scheduling at least one out of K transmission channels $k=1,\ldots,K$ with respective $N_{t,k}$ transmission interfaces and respective $N_{r,k}$ reception interfaces for the transmission of data symbols modulated according to a non-orthonormal matrix modulation that modulates data symbols in both a non-orthogonal spatial domain and at least one orthogonal domain, wherein at least one Equivalent Channel Matrix (ECM) $G_k$ can be defined that transforms said data symbols into data symbols that have been matrix modulated, transmitted over $N_{t,k}$ transmission interfaces and received at $N_{r,k}$ reception interfaces of one of said transmission channels $k=1,\ldots,K$, and wherein an Equivalent Channel Correlation Matrix (ECCM) $R_k = G_k^H \cdot G_k$ of said at least one ECM $G_k$ is not proportional to the identity matrix, said device comprising means for calculating a respective Channel Quality Indicator (CQI) $q_k$ for at least one of said K transmission channels, and means for scheduling at least one of said K transmission channels for the transmission of said matrix modulated data symbols, wherein said scheduling is at least partially based on said calculated CQIs $q_k$.

It is further proposed a transmitting station in a wireless communication system that schedules at least one out of K transmission channels $k=1,\ldots,K$ with respective $N_{t,k}$ transmission interfaces and respective $N_{r,k}$ reception interfaces for the transmission of data symbols modulated according to a non-orthonormal matrix modulation that modulates data symbols in both a non-orthogonal spatial domain and at least one orthogonal domain, wherein at least one Equivalent Channel Matrix (ECM) $G_k$ can be defined that transforms said data symbols into data symbols that have been matrix modulated, transmitted over $N_{t,k}$ transmission interfaces and received at $N_{r,k}$ reception interfaces of one of said transmission channels $k=1,\ldots,K$, and wherein an Equivalent Channel Correlation Matrix (ECCM) $R_k = G_k^H \cdot G_k$ of said at least one ECM $G_k$ is not proportional to the identity matrix, said transmitting station comprising means for calculating a respective Channel Quality Indicator (CQI) $q_k$ for at least one of said K transmission channels, and means for scheduling at least one of said K transmission channels for the transmission of said matrix modulated data symbols, wherein said scheduling is at least partially based on said calculated CQIs $q_k$.

It is further proposed a wireless communication system, comprising at least one transmitting station, and at least one receiving station, wherein a non-orthonormal matrix modulation modulates data symbols in both a non-orthogonal spatial domain and at least one orthogonal domain, wherein said matrix modulated data symbols are transmitted over at least one out of K transmission channels $k=1,\ldots,K$ with respective $N_{t,k}$ transmission interfaces and respective $N_{r,k}$ reception interfaces, wherein at least one Equivalent Channel Matrix (ECM) $G_k$ can be defined that transforms said data symbols into data symbols that have been matrix modulated, transmitted over $N_{t,k}$ transmission interfaces and received at $N_{r,k}$ reception interfaces of one of said transmission channels $k=1,\ldots,K$, wherein an Equivalent Channel Correlation Matrix (ECCM) $R_k = G_k^H \cdot G_k$ of said at least one ECM $G_k$ is not proportional to the identity matrix, wherein said at least one transmitting station calculates a respective Channel Quality Indicator (CQI) $q_k$ for at least one of said K transmission channels, and schedules at least one of said K transmission channels for the transmission of said matrix modulated data symbols, wherein said scheduling is at least partially based on said calculated CQIs $q_k$.

It is further proposed a device for scheduling at least one out of K transmission channels $k=1,\ldots,K$ with respective $N_{t,k}$ transmission interfaces and respective $N_{r,k}$ reception interfaces for the transmission of data symbols, wherein at least two of said data symbols are transmitted in parallel from $N_{t,k}$ transmission interfaces of at least one of said K transmission channels, which is defined by a channel matrix $H_k$, said device comprising means for calculating a respective Channel Quality Indicator (CQI) $q_k$ for at least one of said K transmission channels, wherein at least one of said respective CQIs $q_k$ is calculated as a function of the determinant of a linear function of a channel correlation matrix $H_k^H \cdot H_k$ of said channel matrix $H_k$, and means for scheduling at least one of said K transmission channels for the transmission of said data symbols, wherein said scheduling is at least partially based on said calculated CQIs $q_k$.

It is further proposed a transmitting station that schedules at least one out of K transmission channels $k=1,\ldots,K$ with respective $N_{t,k}$ transmission interfaces and respective $N_{r,k}$ reception interfaces for the transmission of data symbols, wherein at least two of said data symbols are transmitted in parallel from $N_{t,k}$ transmission interfaces of at least one of said K transmission channels, which is defined by a channel matrix $H_k$, said transmitting station comprising means for calculating a respective Channel Quality Indicator (CQI) $q_k$ for at least one of said K transmission channels, wherein at least one of said respective CQIs $q_k$ is calculated as a function of the determinant of a linear function of a channel correlation matrix $H_k^H \cdot H_k$ of said channel matrix $H_k$, and means for scheduling at least one of said K transmission channels for the transmission of said data symbols, wherein said scheduling is at least partially based on said calculated CQIs $q_k$.

It is further proposed a wireless communication system, comprising at least one transmitting station, and at least one receiving station, wherein at least two data symbols are transmitted in parallel from $N_{t,k}$ transmission interfaces of at least one out of K transmission channels with $N_{t,k}$ transmission interfaces and $N_{r,k}$ reception interfaces, wherein said at least one transmission channel is defined by a channel matrix $H_k$, wherein said transmitting station calculates a respective Channel Quality Indicator (CQI) $q_k$ for at least one of said K transmission channels, wherein said transmitting station calculates at least one of said respective CQIs $q_k$ is as a function of the determinant of a linear function of a channel correlation matrix $H_k^H \cdot H_k$ of said channel matrix $H_k$, wherein said at least one transmitting station schedules at least one of said K transmission channels for the transmission of said data symbols, and wherein said scheduling is at least partially based on said calculated CQIs $q_k$.

These and other aspects of the invention will be apparent from and elucidated with reference to the embodiments described hereinafter.

BRIEF DESCRIPTION OF THE FIGURES

In the figures show:

FIG. 3: a table indicating the reduction of the computational complexity required to calculate $R_k$ and det $R_k$ for different non-orthonormal matrix modulation schemes according to the present invention;

DETAILED DESCRIPTION OF THE INVENTION

Figure 1:
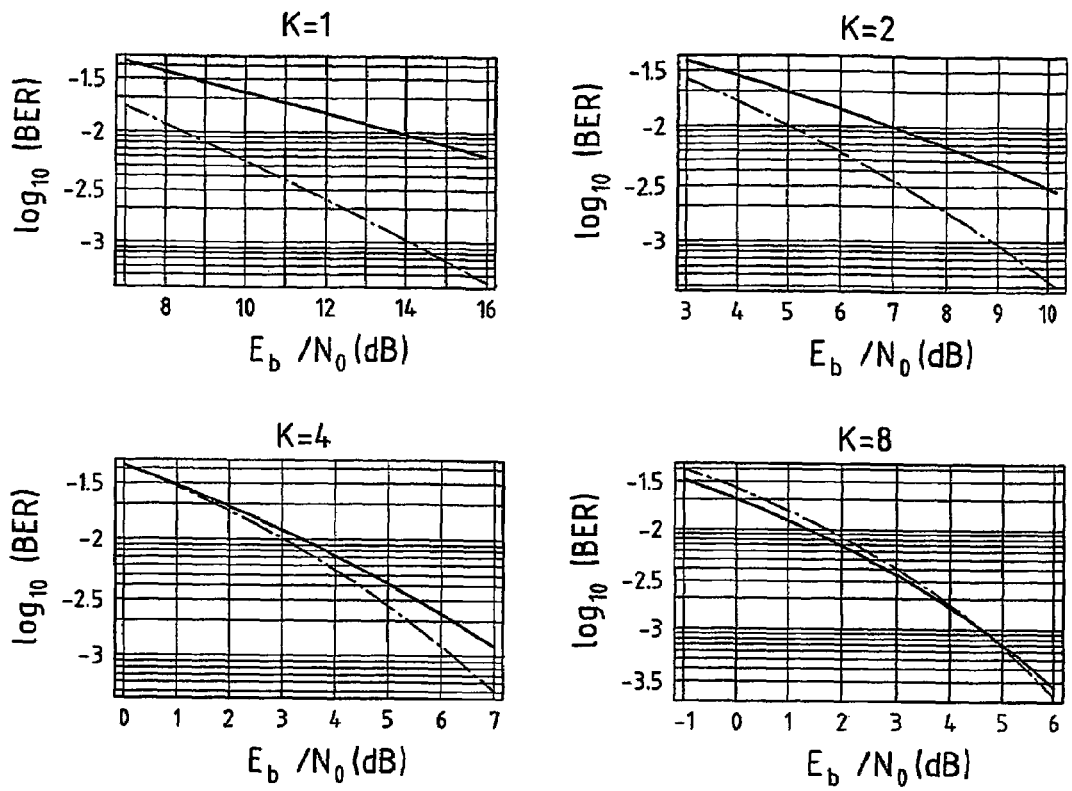
FIG. 1: the Bit Error Ratio (BER) performance achieved when scheduling different numbers of transmission channels K in combination with an orthonormal matrix modulation scheme with two transmit antenna elements (Space Time Transmit Diversity, STTD, dashed lines) and in combination with a single antenna transmission without STTD (solid lines) according to the prior art.
Figure 2:
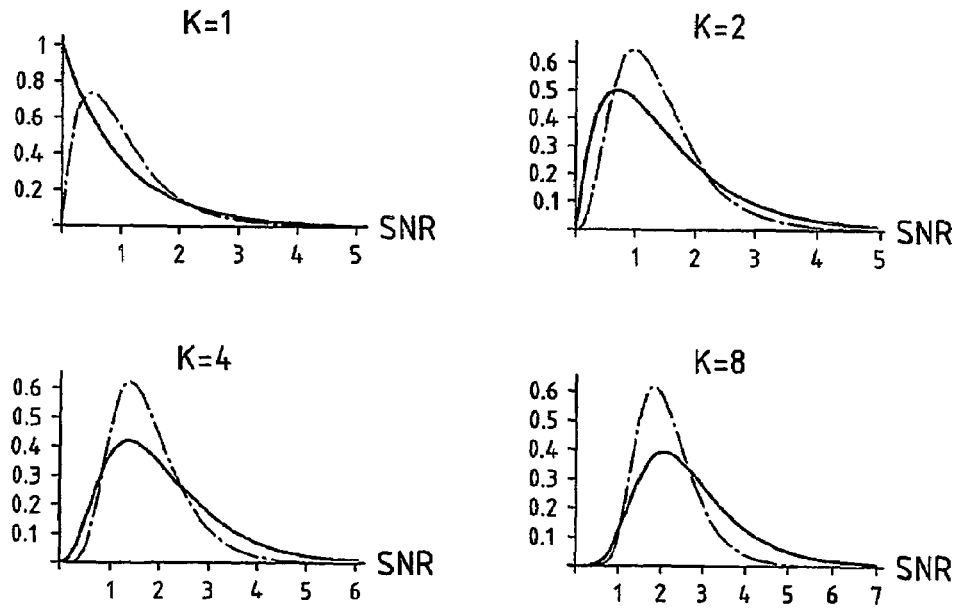
FIG. 2: the Probability Density Function (PDF) of the Signal-to-Noise Ratio (SNR) for the scheduled transmission channel when scheduling of different numbers of transmission channels K is performed in combination with an orthonormal matrix modulation scheme with two transmit antenna elements (Space Time Transmit Diversity, STTD, dashed lines) and in combination with a single antenna transmission without STTD (solid lines) according to the prior art.

The present invention proposes to combine non-orthonormal matrix modulation with scheduling in a selection diversity setting. This approach may depend on the definition of the Channel Quality Indicator (CQI) that serves as a basis for the decision which of the K transmission channels are scheduled to be used for transmitting data symbols that are matrix modulated and transmitted by a transmitter.

The need for the definition of CQI's generally arises in situations where the transmission schemes need to be adapted according to the channel conditions, and different types of adaptation methods require different CQIs. Two distinct types of adaptation can be identified:

1. In systems with multiple transmission channels as the basis for resource allocation, for example scheduling methods in TDMA systems which allocate time slots to the transmission channel with the "best" channel. Here the $CQIe_k$ should correlate with the performance the channel can support.

2. Choosing the right coding and modulation mode to maximize the rate or throughput for the single transmission channel, depending on the channel conditions. The decision can be based on some $CQIm_k$ threshold values after which the coding/modulation should be changed. This means comparing the performance of two different codes/modulations for one fixed channel, so $CQIm_k$ should be sensitive to the number of data streams the channel can support.

Optimally, a CQI for selection diversity is given by the bit error rate, preferably after decoding of channel codes, or the corresponding frame error rate (FER). Often a CQI based on BER after demodulation is used. An ideal CQI has a one-to-one correspondence to the bit error rates (BER), or frame or block error rate. In single stream (and orthogonal multi-stream) channels the CQI with the best correlation to the BER/FER is the received Signal-to-Noise Ratio (SNR), which for orthonormal transmissions generalises to maximum ratio combined (MRC) channel power. This is the generic maximum C/I scheduler discussed e.g. in the Kogiantis reference.

For non-orthonormal transmissions, especially for MIMO transmissions with multiple data streams as considered by the present invention, the situation is not as simple any more. The total channel power, generalising the overall SNR or C/I, is now proportional to the trace of the channel correlation matrix $\mathrm{tr} H_k^H H_k$. MIMO channels with the same $\mathrm{tr}\, H_k^H H_k$ might still lead to very different bit/frame error rates, depending on the specifics of the transmission channel and the chosen transmission scheme.

Finding a good CQI becomes even more complicated when matrix modulation is used to encode the signals. Matrix modulators are designed to offer more diversity into the transmission, and to maximise the mutual information between transmitted and received signals. As a result they possess inherent symmetries restricting their structure. Therefore, the channel quality indicator does not depend solely on the transmission channel, but also on the way the symbols are matrix modulated and detected. This means that in principle different matrix modulation and/or detection methods may require different channel quality indicators.

According to the present invention, thus CQI's suitable for use in multiple transmission channel resource allocation (type 1 in above classification) for non-orthonormal matrix modulated systems are proposed. In particular, comparatively simple CQI's are proposed, which for some transmission modes are—up to the simulation accuracy—in one-to-one correspondence with the BER/FER for reduced search maximum likelihood detection performed at a receiver that receives the data transmission via the scheduled transmission channel.

Before the results of FIGS. 3-7 are discussed, the non-orthonormal matrix modulation schemes according to the preferred embodiments of the present invention will be briefly defined with reference to the orthonormal Alamouti Space-Time code of equation (1) or the transpose thereof (the latter is then denoted as Space-Time Transmit Diversity (STTD) modulation matrix), the signal model of equation (2), the equivalent signal model of equation (3) and the definition of the Equivalent Channel Correlation Matrix (ECCM) $R_k$ of equation (6).

Note that the following embodiments concentrate on space-time matrix modulation techniques, but are also directly applicable to other non-orthonormal matrix modulation techniques such as space-frequency or space-polarization matrix modulation techniques. Thus the scope of the present invention is not to be understood to be limited by the following embodiments.

The Non-orthonormal ABBA Matrix Modulation Scheme

The modulation matrix of this scheme reads as $$X_{ABBA} = \begin{bmatrix} X_A & X_B \\ X_B & X_A \end{bmatrix},$$

wherein $X_A$ is the STTD modulation matrix as transpose of equation (1) with two data symbols $x_1$ and $x_2$, and $X_B$ is the STTD modulation matrix as transpose of equation (1) with two further data symbols $x_3$ and $x_4$. For optimal performance, these symbols may be chosen as linear combinations and/or rotations of the complex modulated symbols. This applies to all matrix modulations discussed in this invention. The modulation matrix $X_{ABBA}$ thus represents a rate 1 matrix modulator which maps 4 data symbols onto 4 transmit antenna elements in 4 symbol periods. The ECCM of the ABBA modulation scheme can be identified as $$R_k = \begin{bmatrix} p_k & 0 & n_k & 0 \\ 0 & p_k & 0 & n_k \\ n_k & 0 & p_k & 0 \\ 0 & n_k & 0 & p_k \end{bmatrix},$$

wherein $p_k$ is the total power of all channels and $n_k$ denotes the strength of the interference between the two different STTD blocks $X_A$ and $X_B$.

For the exemplary case of $N_t=4$ transmit antennas and $N_{k,r}=2$ receive antennas, the real-valued functions $p_k$ and $n_k$ are defined as:

$$p_k = trH_k^H H_k = \frac{1}{4}\sum|h_{k,ij}|^2$$

$$n_k = \frac{1}{2}(Re(h_{k,13}h_{k,11}^*) + Re(h_{k,12}h_{k,14}^*) + Re(h_{k,23}h_{k,21}^*) + Re(h_{k,24}h_{k,22}^*)).$$

It can be seen that $R_k$ has only two distinct eigenvalues $p_k \pm n_k$. Note that the number of distinct eigenvalues does not depend on the size of the original channel matrix, only the explicit forms of the elements $p_k$, $n_k$ do. Since the determinant is given by the product of the eigenvalues we get for ABBA:

$$\det R_k = (p_k^2 - n_k^2)^2,$$

which is proportional to |diagonal part|$^2$−|off-diagonal part|$^2$ of $R_k$. Note that, by using the structure of the matrix modulator, we have first simplified the calculation of $R_k = H_k^H H_k$ for $N_{k,r}=2$ receive antennas from 128 complex multiplications and 112 complex additions (128 C×, 112 C+) to 12 complex multiplications and 10 real additions (12 C×, 10 R+), and further reduced the complexity of calculating det $R_k$ from (40 C×, 30 C+) to (3 R×, 1 R+). This is a significant complexity reduction indeed. Further complexity reduction can be found if the inverse of $R_k$ is needed for scheduling or detection; the inverse is trivially $$R_k^{-1} = \frac{1}{p_k^2 - n_k^2}\begin{bmatrix} p_k & 0 & -n_k & 0 \\ 0 & p_k & 0 & -n_k \\ -n_k & 0 & p_k & 0 \\ 0 & -n_k & 0 & p_k \end{bmatrix}$$

Note in particular that the diagonal elements of the inverse are proportional to the trace and inversely proportional to the determinant.

Instead of the determinant of the ECCM we can use also the more general CQI of a determinant of a linear function of the ECCM. For ABBA this simplies to $((a+p_k)^2 - n_k^2)$, where a is a constant which can be determined numerically to maximize the correlation to the performance. For example, for QPSK modulation and reduced search maximum likelihood detection, with two receive antennas the best fit was found for a=0.15.

A variant of the ABBA matrix modulation is so called diagonal ABBA; The modulation matrix is written as $$X_{ABBA} = \begin{bmatrix} X_A + X_B & 0 \\ 0 & X_A - X_B \end{bmatrix}$$

Now the ECCM is diagonal, but not orthonormal. The determinant of the ECCM is the same as for ordinary ABBA.

The Non-orthonormal DABBA Matrix Modulation Scheme

The modulation matrix of this scheme reads as $$X_{DABBA} = \begin{bmatrix} X_A + X_C & X_B + X_D \\ X_B - X_D & X_A - X_C \end{bmatrix},$$

wherein $X_A$, $X_B$, $X_C$ and $X_D$ are the STTD modulation matrix as transposes of equation (1) with two data symbols each, respectively. The modulation matrix $X_{DABBA}$ thus represents a rate 2 matrix modulator which maps 8 data symbols onto 4 transmit antenna elements in 4 symbol periods. The ECCM of the DABBA modulation scheme can be identified as $$R_k = \begin{bmatrix} p_{k,1}+p_{k,2} & 0 & n_{k,1} & 0 & p_{k,1}-p_{k,2} & 0 & i \cdot n_{k,2} & s_k^* \\ 0 & p_{k,1}+p_{k,2} & 0 & n_{k,1} & 0 & p_{k,1}-p_{k,2} & -s_k & i \cdot n_{k,2} \\ n_{k,1} & 0 & p_{k,1}+p_{k,2} & 0 & i \cdot n_{k,2} & -s_k^* & -p_{k,1}+p_{k,2} & 0 \\ 0 & n_{k,1} & 0 & p_{k,1}+p_{k,2} & s_k & i \cdot n_{k,2} & 0 & -p_{k,1}+p_{k,2} \\ p_{k,1}-p_{k,2} & 0 & i \cdot n_{k,2} & s_k^* & p_{k,1}+p_{k,2} & 0 & n_{k,1} & 0 \\ 0 & p_{k,1}-p_{k,2} & -s_k & i \cdot n_{k,2} & 0 & p_{k,1}+p_{k,2} & 0 & n_{k,1} \\ i \cdot n_{k,2} & -s_k^* & -p_{k,1}+p_{k,2} & 0 & n_{k,1} & 0 & p_{k,1}+p_{k,2} & 0 \\ s & i \cdot n_{k,2} & 0 & -p_{k,1}+p_{k,2} & 0 & n_{k,1} & 0 & p_{k,1}+p_{k,2} \end{bmatrix}$$

where $p_{k,1}$, $p_{k,2}$ are the total channel powers from antenna pairs (1, 2) and (3, 4) to all receive antennas, respectively, $n_{k,1}$, $n_{k,2}$ are real combinations of the elements of $H_k$, and $s_k$ a complex term. Again, $p_{k,1}+p_{k,2}$ on the diagonal of $R_k$ is the total channel power, and the other terms on the off-diagonal describe the interference between the blocks. And again, $R_k$ has only two different eigenvalues:

$$p_{k,1}+p_{k,2}\pm\sqrt{(p_{k,1}p_{k,2})^2+n_{k,2}^2+|s_k|^2},$$

so the determinant reads as $$\det R_k=(4p_{k,1}p_{k,2}+n_{k,1}^2-n_{k,2}^2+|s_k|^2)^4.$$

The inverse of $R_k$ can be constructed in similar fashion as for the ABBA scheme. The complexity reduction in this case is really huge, and can be found in the table of FIG. 3. Thus using the disclosed methods, scheduling of high rate, high diversity modulators of the DABBA-kind really becomes practical. Similar simple expression for det $R_k$ can be obtained to other matrix modulators as well, due to their large internal symmetries.

For the det $(aI+R_k)$, $$(4 \cdot p_{k,1} \cdot p_{k,2}+(p_{k,1}+p_{k,2})(a^2+2a)+n_{k,1}-n_{k,2}^2+|s_k|^2)^4$$

The constant a can be again determined numerically, the best value for QPSK modulation and reduced search maximum likelihood detection, with two receive antennas was found to be 0.04.

The Non-orthonormal DSTTD Matrix Modulation Scheme

The modulation matrix of this scheme reads as $$X_{DSTTD}=[X_A X_B],$$

wherein $X_A$ and $X_B$ are the modulation matrix given by the transposed Alamouti code of equation (1) with two data symbols each, respectively. The modulation matrix $X_{DSTTD}$ thus represents a rate 2 matrix modulator which maps 4 data symbols onto 4 transmit antenna elements in 2 symbol periods.

The Non-orthonormal TSTTD Matrix Modulation Scheme

The modulation matrix of this scheme reads as $$X_{TSTTD} = X_A + \frac{1}{\sqrt{7}}\begin{bmatrix} 1+i & 1+2i \\ -1+2i & 1-i \end{bmatrix} \cdot X_B,$$

wherein $X_A$ is the STTD modulation matrix as the transpose of equation (1) with two data symbols $x_1$ and $x_2$, and $X_B$ is the STTD modulation matrix as the transpose of equation (1) with two further data symbols $x_3$ and $x_4$. The modulation matrix $X_{TSTTD}$ thus represents a rate 2 matrix modulator which maps 4 data symbols onto 2 transmit antenna elements in 2 symbol periods. The ECCM of the TSTTD modulation scheme can be identified as $$R_k = \begin{bmatrix} p_{k,1}+p_{k,2} & 0 & p_{k,1}-p_{k,2} & s_k \\ 0 & p_{k,1}+p_{k,2} & s_k^* & p_{k,2}-p_{k,1} \\ p_{k,1}-p_{k,2} & s_k & p_{k,1}+p_{k,2} & 0 \\ s_k^* & p_{k,2}-p_{k,1} & 0 & p_{k,1}+p_{k,2} \end{bmatrix}$$

where $p_{k,1}$ and $p_{k,2}$ are the total powers from transmit antennas 1 and 2 to all receive antennas, respectively, and $s_k$ is given as $$s_k=2h^*_{k,11}h_{k,12}+2h^*_{k,21}h_{k,22},$$

when $H_k$ is 2×2. The ECCM $R_k$ of TSTTD has the remarkable property that $$\det R_k=(\det H_k^H H_k)^2,$$

indicating that in this case the equivalent-channel-based scheduling and matrix-channel-based scheduling are equivalent for the preferred CQI, leading to further simplification in calculating equivalent channel based CQIs.

FIG. 3 depicts the computational complexity encountered when calculating the ECCM $R_k$ and its determinant det $R_k$ for the ABBA, DABBA and TSTTD schemes directly, or with the simple closed-form expressions that are proposed by the present invention. The computational complexity is given in terms of real (R×) and complex (C×) multiplications and in terms of real (R+) and complex (C+) additions.

For the TSTTD scheme, det $R_k$ can be calculated directly from det $H_k$. The complexity of the proposed algorithms for calculating the determinant is the 2Q-th root of the complexity of the direct method, where Q is the number of complex symbols in the modulation, i.e. 4, 8 and 4 for ABBA, DABBA and TSTTD, respectively.

Figure 4:
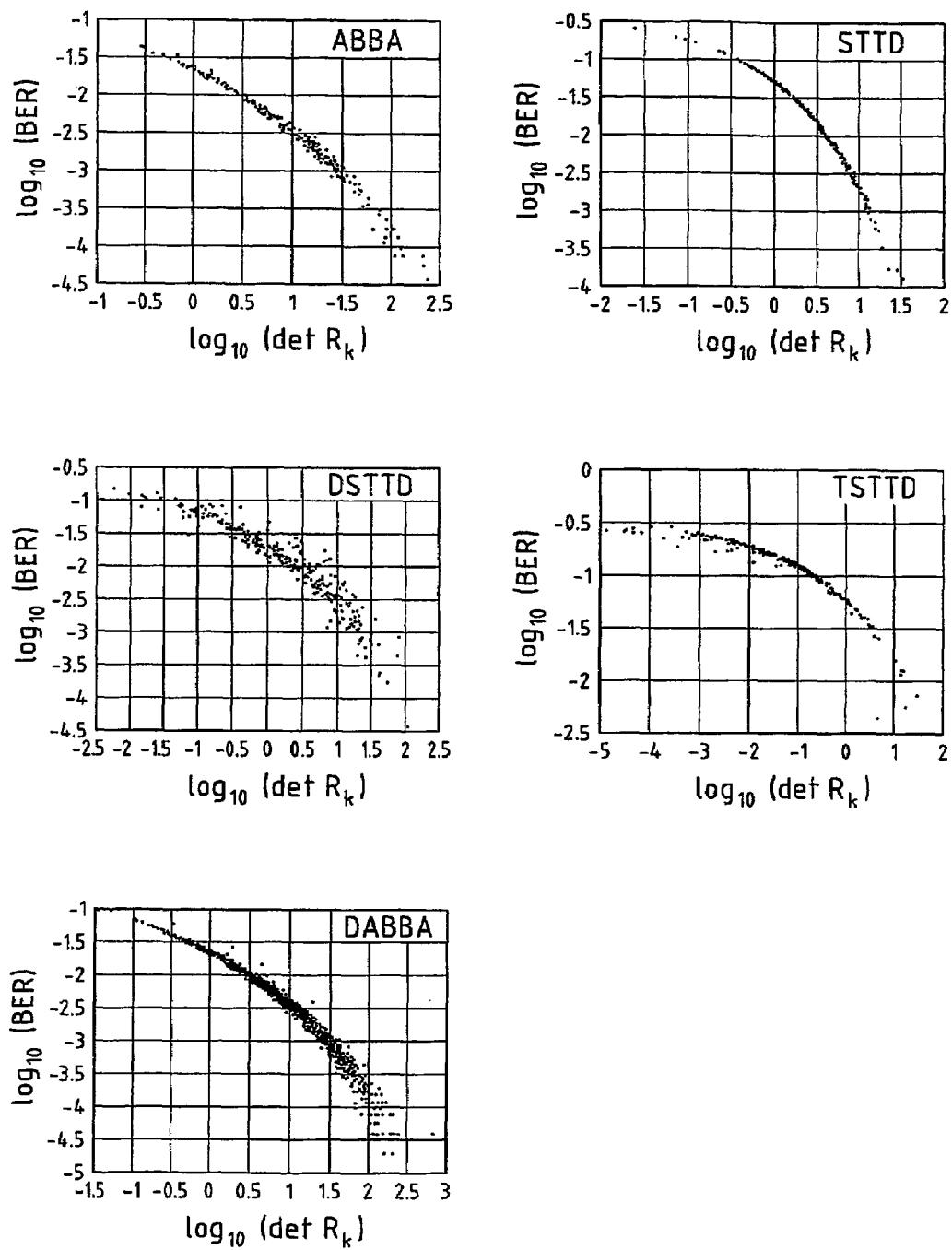
FIG. 4: the correlation between the BER and the CQI $q_k$=det $R_k$ for different orthonormal and non-orthonormal matrix modulation schemes according to the present invention.

FIG. 4 depicts the correlation between the BER and the preferred CQI $q_k$=det $R_k$ for different orthonormal (STTD) and non-orthonormal (ABBA, DSTTD, TSTTD and DABBA) matrix modulation schemes according to the present invention. The simulations assumed Additive White Gaussian Noise (AWGN) at the receiving side of the transmission channel with an $E_b/N_0$ fixed at 6 dB, QPSK modulated symbols were used as data symbols, and the entries in the transmission channel matrix were assumed-to be i.i.d. Rayleigh-distributed.

Apparently, the proposed CQI $q_k$=det $R_k$ exhibits a strong correlation to the BER for all simulated orthonormal and non-orthonormal matrix modulation schemes. Because the BER is a monotonic function of $E_b/N_0$, the qualitative results obtained at one operation point should not change with $E_b/N_0$. The results should persist also for higher order modulations, since the pairwise error probabilities can be expressed in terms of pairwise error probabilities of a BPSK modulated system. The effects of other types of detection instead of reduced search ML, such as for instance linear detection algorithms as the zero-forcing block linear detector or the minimum mean-square error block linear detector is still to be studied.

Figure 5A:
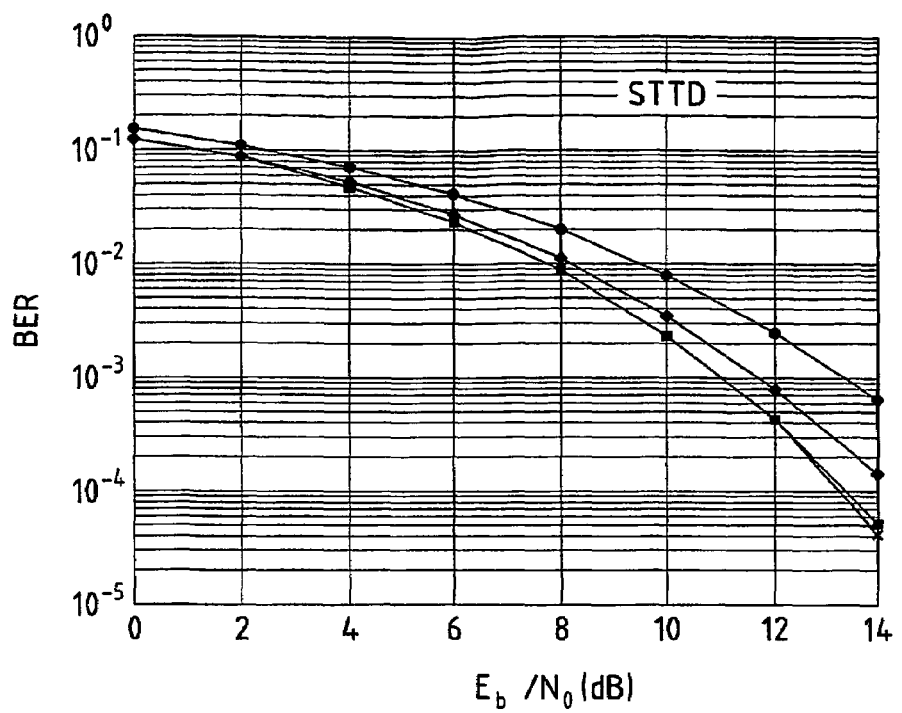
FIG. 5A: the BER as a function of $E_b/N_0$ for different orthonormal (STTD) and non-orthonormal (TSTTD) matrix modulation schemes and different choices of CQI when scheduling one out of K=2 transmission channels according to the present invention.
Figure 5A:
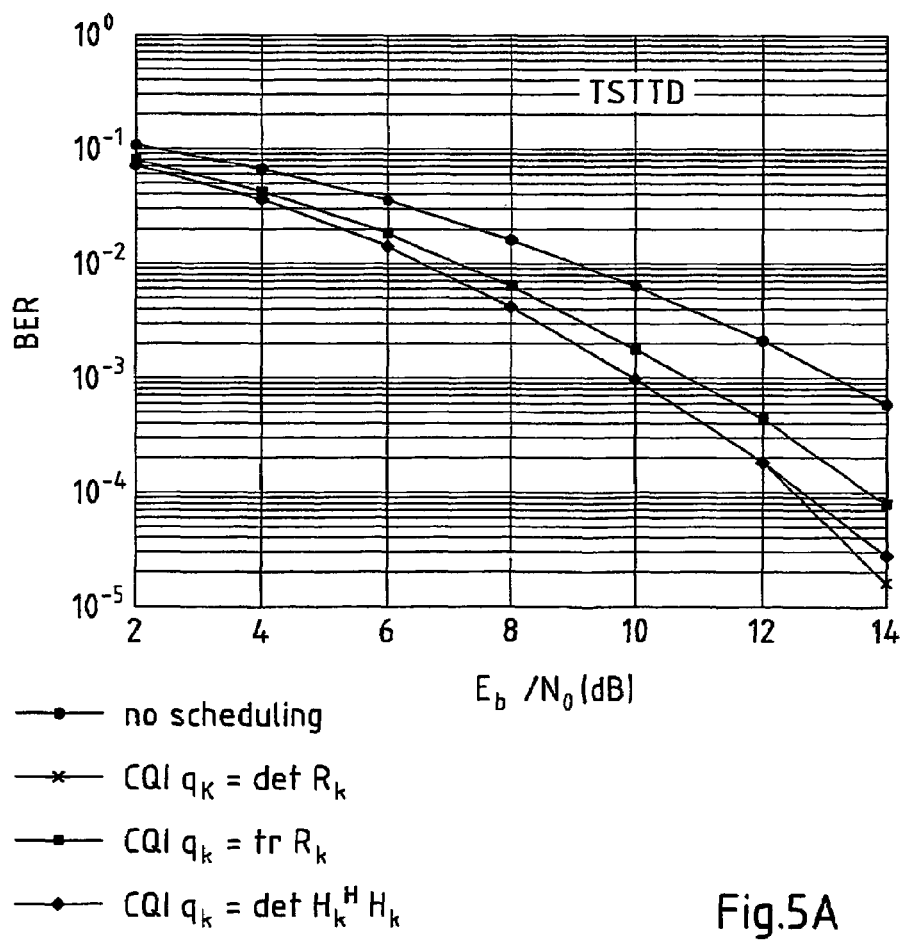
Figure 5B:
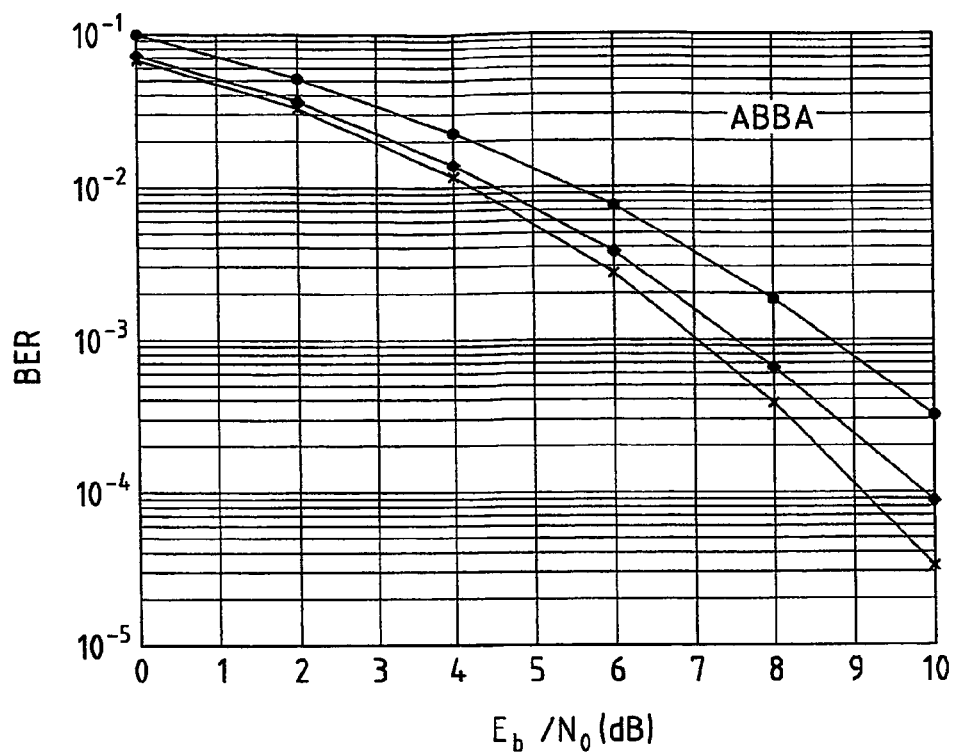
FIG. 5B: the BER as a function of $E_b/N_0$ for different non-orthonormal (ABBA, DSTTD) matrix modulation schemes and different choices of CQI when scheduling one out of K=2 transmission channels according to the present invention.
Figure 5B:
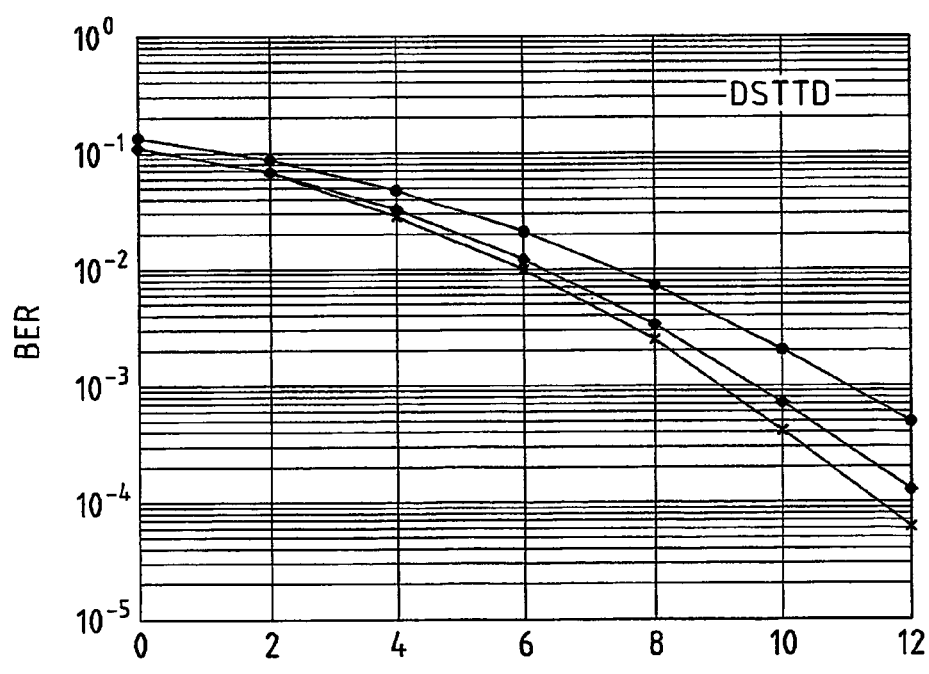
Figure 5C:
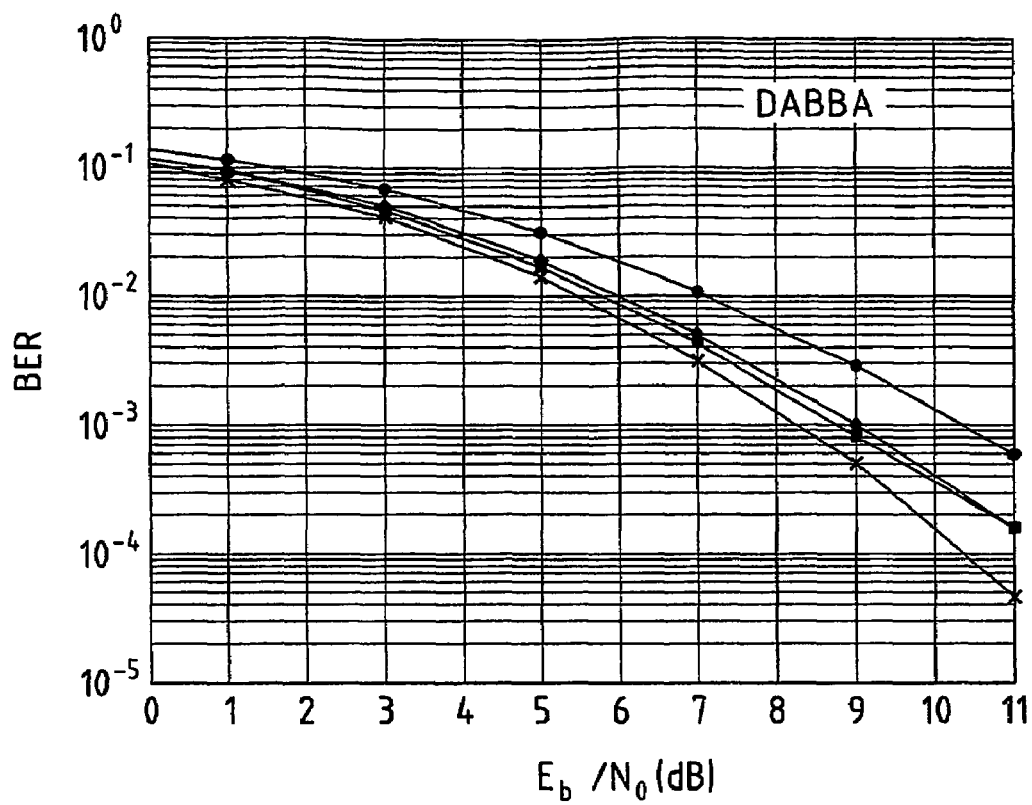
FIG. 5C: the BER as a function of $E_b/N_0$ for the non-orthonormal DABBA matrix modulation scheme and different choices of CQI when scheduling one out of K=2 transmission channels according to the present invention.

FIGS. 5A, 5B and 5C depict the simulated BER as a function of $E_b/N_0$ for different orthonormal (STTD) and non-orthonormal (TSTTD, ABBA, DSTTD and DABBA) matrix modulation schemes and different choices of CQI when scheduling one out of K=2 transmission channels according to the present invention. Rayleigh-fading transmission channels, AWGN at the reception interfaces of the scheduled transmission channel, and opportunistic scheduling of the transmission channel with the better CQI irrespective of the state of the potential temporal scheduling constraints such as mean packet delay, etc. was performed. For STTD and TSTTD, 16-QAM modulated data symbols were transmitted, whereas for ABBA, DSTTD and DABBA, QPSK-modulated symbols were transmitted. Except for STTD, which has a bit rate of 2 bps, all non-orthonormal schemes have a bit rate of 4 bps.

For each matrix modulation scheme, the BER performance without scheduling (one of the K=2 transmission channels is chosen arbitrarily irrespective of his CQI), with CQI $q_k$=det $R_k$ and CQI $q_k$=det$H_k^H H_k$ is depicted. For the STTD, DABBA and TSTTD schemes, additionally the BER performance for CQI $q_k$=tr $R_k$ is depicted.

As can be readily seen from FIGS. 5A, 5B and 5C, scheduling based on the CQI $q_k$=det $R_k$ performs best for all investigated matrix modulation schemes. However, significant gains in $E_b/N_0$ with respect to the BER performance of a system without scheduling are also achieved for the CQIs based on the trace of $R_k$ and the determinant of $H_k^H H_k$.

Further possible choices of CQI comprise the trace of the inverse of $R_k$, the condition number of $H_k$, the condition number of $G_k$, and the ratio or difference between the magnitude of the diagonal and off-diagonal parts of $R_k$.

Figure 6:
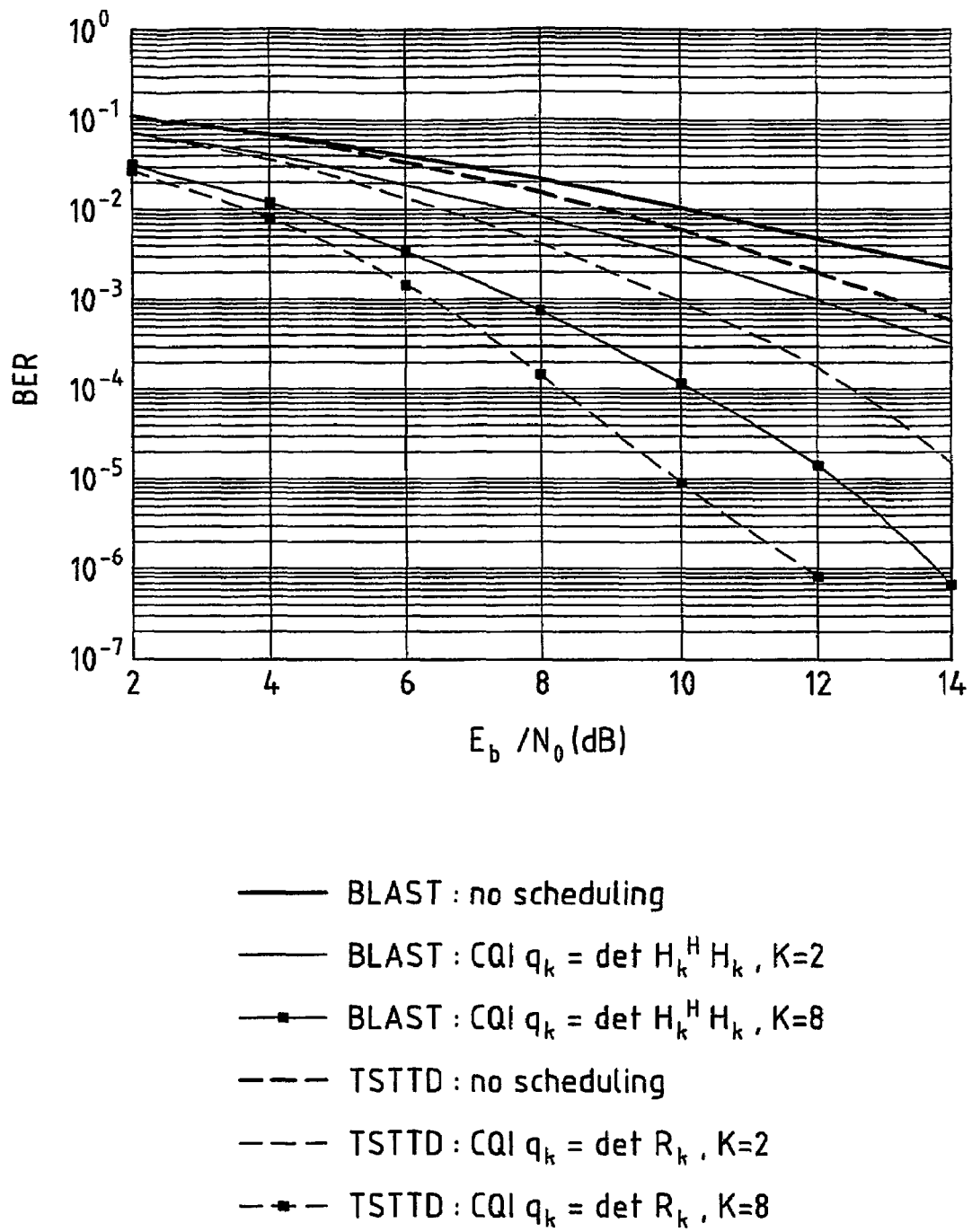
FIG. 6: the BER as a function of $E_b/N_0$ for scheduling in combination with non-orthonormal BLAST and TSTTD matrix modulations for different numbers of transmission channels K according to the present invention.

The performance of vector modulation as for instance the Bell Laboratories Layered Space Time Architecture (BLAST) scheme in combination with scheduling in a selection diversity setting with K=2 and K=8 transmission channels is depicted in FIG. 6 and compared to the performance of a TSTTD scheme.

In FIG. 6, both schemes use $N_t=2$ transmit and $N_{k,r}=2$ receive antenna elements and QPSK modulated data symbols, the noise is AWGN, and the transmission channels are i.i.d. flat Rayleigh-fading channels. In each scheme, 4 data symbols are transmitted during two time instants, wherein the modulation matrix for the BLAST scheme reads as $$X_{BLAST} = \begin{bmatrix} x_1 & x_3 \\ x_2 & x_4 \end{bmatrix},$$

i.e. two data symbols are mapped to the non-orthogonal spatial resources in each symbol period.

FIG. 6 depicts both the results for scheduling with K=2 and K=8 transmission channels and the results without any scheduling. For the scheduling results, the transmission channel with the maximum CQI $q_k$=det $R_k$ was scheduled for the TSTTD scheme, and the transmission channel with the maximum CQI $q_k$=deth $H_k^H H_k$ was scheduled for the BLAST case.

It is clearly visible from FIG. 6 that scheduling increases the performance of both TSTTD (dashed curves) and BLAST (solid curves) in particular when the number of transmission channels K is increased. The gains from the scheduling are larger for the BLAST scheme so the difference in its performance will decrease when more transmission channels are added. But even for K=8 transmission channels the TSTTD still has better performance at BER=$10^{-3}$, the difference in $E_b/N_0$ being approximately 1.5 dB. Also, the simulation was for opportunistic scheduling the results only show the upper limit for the scheduling gains. In practice, the gains may be smaller, which means that TSTTD may perform better for even larger number of transmission channels than expected from the opportunistic scheduling results. Also, when the CQI is allowed to be proportional to the determinant of a linear function, i.e. $q_k$=det(aI+$H_k^H H_k$) and the constant a is adjusted for each scheme to ensure the best correlation between the CQI and BER it can be seen that the gains will increase further. In this case the optimal constant for TSTTD was 0.04, and for BLAST 0.0.

Figure 7:
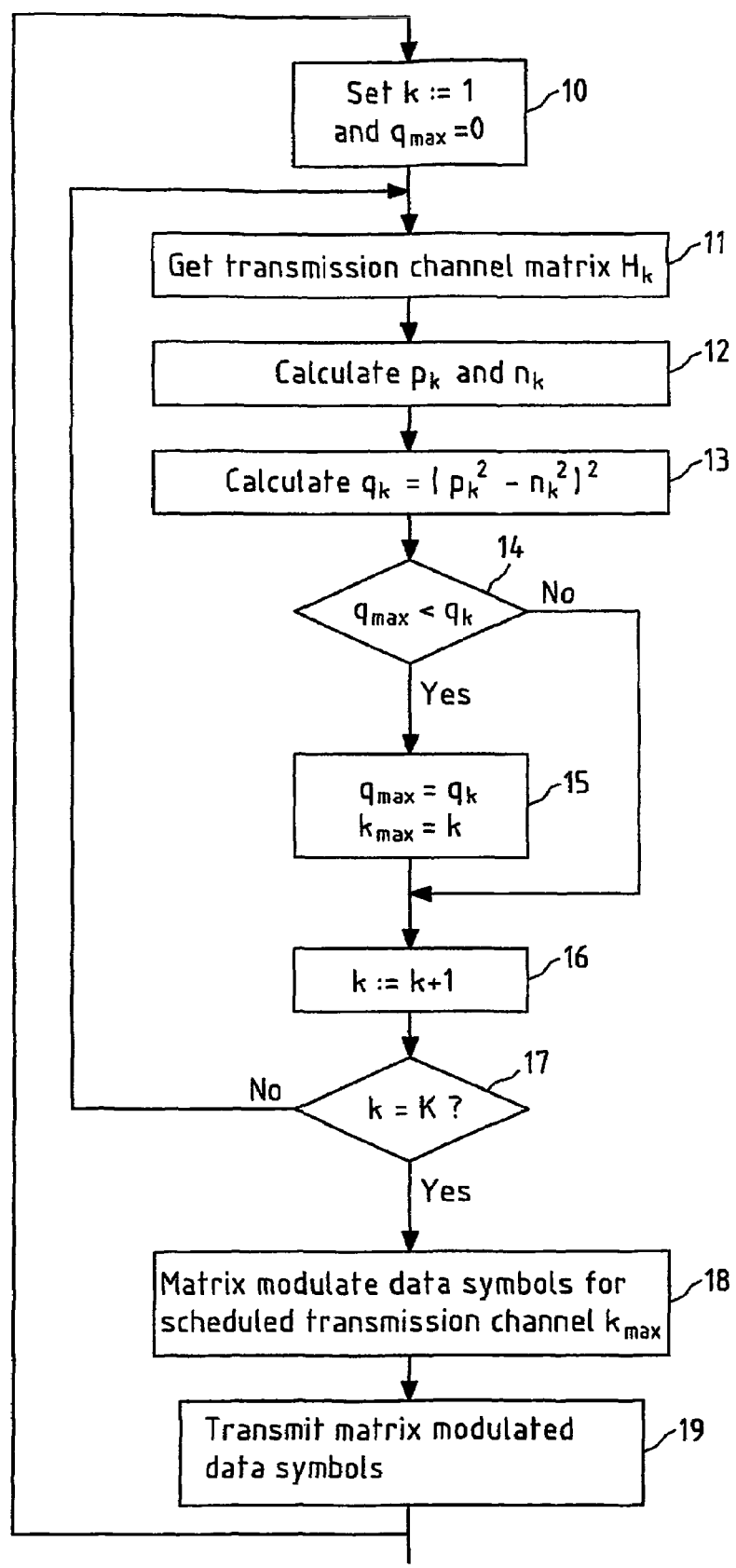
FIG. 7: a flowchart of a method according to the present invention.

FIG. 7 depicts a flow chart according to the first preferred embodiments of the present invention (the ABBA non-orthonormal matrix modulation scheme).

In a first step 10, the transmission channel index is initialised with 1, and a variable $q_{max}$ is set to zero. Subsequently the channel matrix $H_k$ is fetched from a storage or estimated from signals that have been received via said transmission channel before. From said channel matrix $H_k$, then the functions $p_k$ and $n_k$ are computed in a step 12. In a step 13, the CQI $q_k$=det $R_k$ is computed from the functions $p_k$ and $n_k$. This CQI $q_k$ is then compared to $q_{max}$ in a step 14, and if $q_k$ is larger than $q_{max}$, $q_{max}$ is set equal to $q_k$ and a variable $k_{max}$ is set equal to k in a step 15. In a step 16, the transmission channel index k is increased by 1, and it is checked in a step 17 if the transmission channel index k equals the number of transmission channels K among which scheduling is performed. If this is not the case, steps 11 to 16 are repeated until the transmission channel index k equals K. Then, in a step 18, matrix modulation according to the ABBA scheme is performed for the data symbols that are to be transmitted via the transmission channel with index $k_{max}$. The matrix modulated data symbols then are transmitted in a step 19, and the flowchart is processed again starting with step 10.

Figure 8:
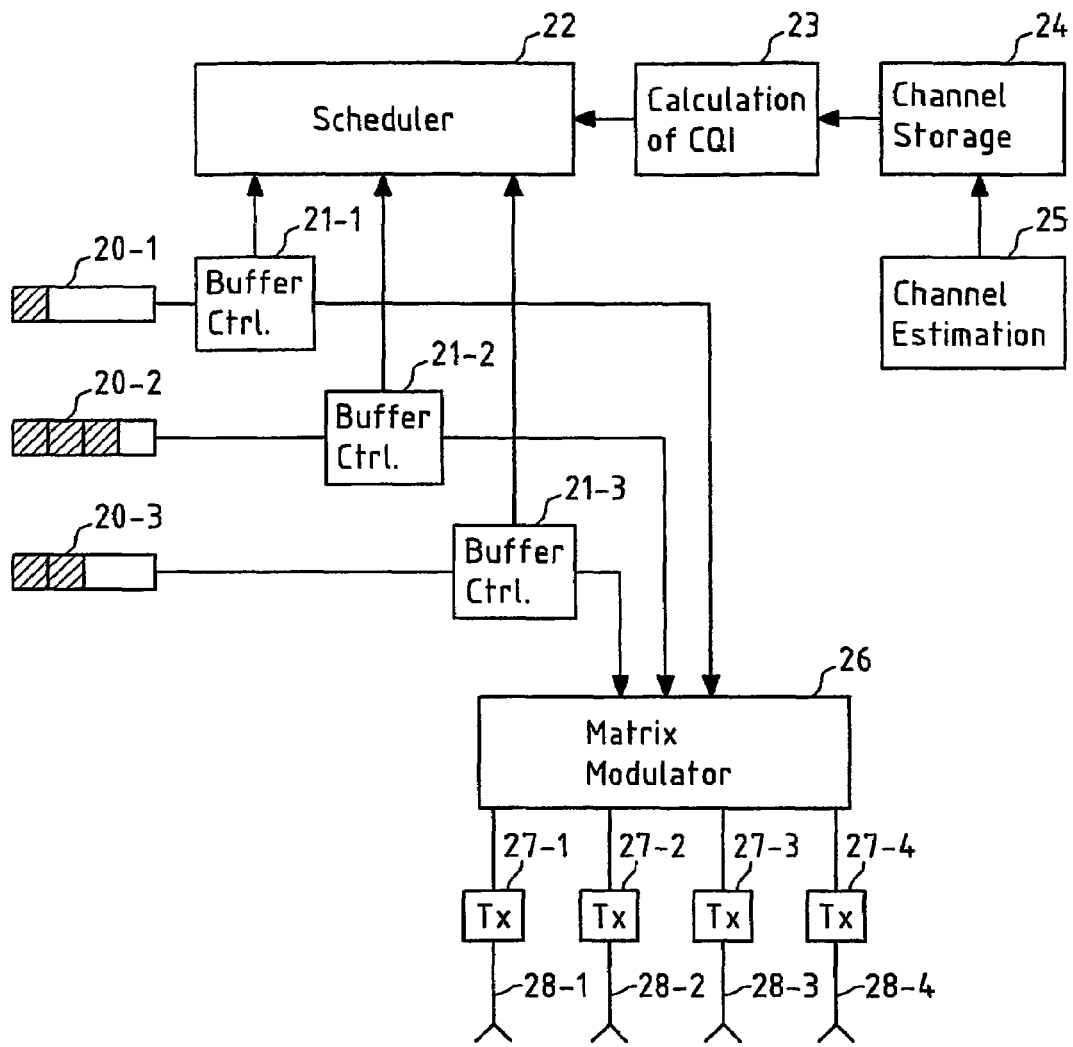
FIG. 8: a device according to the present invention.

FIG. 8 depicts a device according to the present invention. The device comprises respective data packet buffers 20-1 . . . 20-3, which contain data packets that arrive at said device and are to be transmitted via K respective transmission channels, wherein in the example of FIG. 8, K=3 holds. Each packet buffer 20-1 . . . 20-3 is controlled by a buffer controller 21-1 . . . 21-3, respectively. The buffer controller 21-1 . . . 21-3 signals the state of the buffers 20-1 . . . 20-3 to a scheduler 22. Furthermore, when being triggered by said scheduler 22, said buffer controllers 21-1 . . . 21-3 are capable of transferring data packets to a matrix modulator 26, wherein the data symbols contained in the data packets are matrix modulated and subsequently transmitted via transmit modules 27-1 . . . 27-4 and transmit antenna elements 28-1 . . . 28-4. Said scheduler 22 further receives input from a CQI calculation instance 23, which fetches transmission channel data from a channel storage 24, which in turn is updated by a channel estimation instance 25. The CQI calculation instance 23 determine CQIs for a number of K transmission channels based on the respective transmission channel data fetched from said channel storage 24. For instance, when the ABBA matrix modulation scheme is applied, said CQI calculation instance 23 computes the functions $p_k$ and $n_k$ from the entries $h_{k,ij}$ in the channel matrices $H_k$ and then determines a CQI $q_k$ from said functions $p_k$ and $n_k$. The calculated CQIs are then fed into the scheduler 22. Based on the input from the CQI calculation instance 23 and on the input from the buffer controllers 21-1 . . . 21-3, the scheduler determines which of the K transmission channels is preferably scheduled for the transmission of matrix modulated data symbols, so that the BER of said transmission is as low as possible. This scheduling is at least partially based on the CQIs as calculated by said instance 23. However, it may be imagined that, although the $CQI_1$ of transmission channel k=1 is larger than the $CQI_2$ of a transmission channel k=2, a data packet in data packet buffer 20-2 which is associated with transmission channel k=2 is matrix modulated and transmitted, because said data packet is more urgent than the data packets in the data packet buffer 20-1 that is associated with transmission channel k=1. The results of the scheduling is signalled to the corresponding buffer controller 21-1 . . . 21-3 which then forwards a data packet to the matrix modulator 26 for matrix modulation and transmission.

The invention has been described above by means of preferred embodiments. It should be noted that there are alternative ways and variations which are obvious to a skilled person in the art and can be implemented without deviating from the scope and spirit of the appended claims. In particular, the proposed CQIs can be used as a part in any scheduling algorithm that operates in a MIMO/MISO system, where link-specific information is taken into account when scheduling. The proposed CQI work for any non-orthonormal MIMO or MISO transmission scheme. The proposed algorithms work in any concatenated feedback/beamforming scheme, with any duplexing (FDD/TDD/mixed), multiple access (CDMA,TDMA,SDMA,OFDMA) single carrier/multicarrier (MC-CDMA/OFDMA) system. Any channel code (trellis, convolutional, turbo, block, LDPC, TCM), any modulation (PAM, PSK, QAM, higher dimensional spherical/lattice) and joint/separate channel coding/space-time coding/modulation, joint/separate detection/decoding (linear, decorrelating, LMMSE, maximum likelihood, reduced search maximum likelihood, sphere) can be used. The only requirement may be that at some stage the transmission can be described by a vector (in non-orthogonal spatial resources) or a matrix (in non-orthogonal spatial and substantially orthogonal resources) that is actually transmitted from the non-orthogonal spatial resources (antennas/beams/polarizations) and substantially orthogonal resources (time, frequency, subcarrier, code, spatial/polarization eigenmodes).

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural eciuivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
   calculating a respective channel quality indicator $q_k$ for at least one of K transmission channels k=1, . . . ,K with resrective $N_{t,k}$ transmission interfaces and resrective $N_{r,k}$ recertion interfaces, and
   scheduling at least one of said K transmission channels for the transmission of data symbols modulated according to a non-orthonormal matrix modulation that modulates data symbols in both a non-orthogonal spatial domain and at least one orthogonal domain, wherein at least one equivalent channel matrix $G_k$ can be defined that transforms said data symbols into data symbols that have been matrix modulated, transmitted over $N_{t,k}$ transmission interfaces and received at $N_{r,k}$ reception interfaces of one of said transmission channels k=1, . . . ,K, wherein an equivalent channel correlation matrix $R_k=G_k^H \cdot G_k$ of said at least one equivalent channel matrix $G_k$ is not proportional to the identity matrix, and wherein said scheduling is at least partially based on said calculated channel quality indicators $q_k$.

2. The method according to claim 1, wherein at least one receiver uses a maximum likelihood algorithm or a linear estimator to estimate said data symbols that are transmitted over said scheduled transmission channel and received by said receiver via said reception interfaces of said scheduled transmission channel.

3. A computer program product comprising a computer program with instructions stored in a memory, said instructions operable to cause a processor to perform the method of claim 1.

4. An apparatus comprising:
   a calculation module for calculating a respective channel quality indicator $q_k$ for at least one of K transmission channels k=1, . . . ,K with resrective $N_{t,k}$ transmission interfaces and resrective $N_{r,k}$ reception interfaces, and
   a scheduler for scheduling at least one of said K transmission channels for the transmission of data symbols modulated according to a non-orthonormal matrix modulation that modulates data symbols in both a non-orthogonal spatial domain and at least one orthogonal domain, wherein at least one equivalent channel matrix $G_k$ can be defined that transforms said data symbols into data symbols that have been matrix modulated, transmitted over $N_{t,k}$ transmission interfaces and received at $N_{r,k}$ reception interfaces of one of said transmission channels k=1, . . . ,K, wherein an equivalent channel correlation matrix $R_k=G_k^H \cdot G_k$ of said at least one equivalent channel matrix $G_k$ is not proportional to the identity matrixsaid matrix modulated data symbols, and wherein said scheduling is at least partially based on said calculated channel quality indicators $q_k$.

5. The apparatus according to claim 4, wherein said calculation module is configured to derive said respective channel quality indicator $q_k$ for at least one of said K transmission channels from said equivalent channel correlation matrix $R_k$.

6. The apparatus according to claim 5, wherein said calculation module is configured to calculate said respective channel quality indicator $q_k$ for at least one of said K transmission channels as a function of the determinant of a linear function of said equivalent channel correlation matrix $R_k$.

7. The apparatus according to claim 5, wherein said calculation module is configured to calculate said respective channel quality indicator $q_k$ for at least one of said K transmission channels as a function of the trace of said equivalent channel correlation matrix $R_k$.

8. The apparatus according to claim 5, wherein said calculation module is configured to calculate said respective channel quality indicator $q_k$ for at least one of said K transmission channels as a function of the trace of the inverse of said equivalent channel correlation matrix $R_k$.

9. The apparatus according to claim 4, wherein said calculation module is configured to calculate said respective channel quality indicator $q_k$ for at least one of said K transmission channels as a function of the elements of a channel matrix $H_k$, which defines said at least one transmission channel, and to derive said function from said equivalent channel correlation matrix $R_k$ under exploitation of the structural properties of said equivalent channel correlation matrix $R_k$.

10. The apparatus according to claim 9, wherein said equivalent channel correlation matrix $R_k$ is of the form $$R_k = \begin{bmatrix} p_k & 0 & n_k & 0 \\ 0 & p_k & 0 & n_k \\ n_k & 0 & p_k & 0 \\ 0 & n_k & 0 & p_k \end{bmatrix}, \text{ and}$$

wherein $p_k$ and $n_k$ are real-valued functions of the elements of said channel matrix $H_k$.

11. The apparatus according to claim 10, wherein said calculation module is configured to calculate said respective channel quality indicator $q_k$ for at least one of said K transmission channels as a function of $((a+p_k)^2-n_k^2)^2$, and wherein a is a constant value.

12. The apparatus according to claim 9, wherein said equivalent channel correlation matrix $R_k$ is of the form $$R_k = \begin{bmatrix} p_{k,1}+p_{k,2} & 0 & n_{k,1} & 0 & p_{k,1}-p_{k,2} & 0 & i \cdot n_{k,2} & s_k^* \\ 0 & p_{k,1}+p_{k,2} & 0 & n_{k,1} & 0 & p_{k,1}-p_{k,2} & -s_k & i \cdot n_{k,2} \\ n_{k,1} & 0 & p_{k,1}+p_{k,2} & 0 & i \cdot n_{k,2} & -s_k^* & -p_{k,1}+p_{k,2} & 0 \\ 0 & n_{k,1} & 0 & p_{k,1}+p_{k,2} & s_k & i \cdot n_{k,2} & 0 & -p_{k,1}+p_{k,2} \\ p_{k,1}-p_{k,2} & 0 & i \cdot n_{k,2} & s_k^* & p_{k,1}+p_{k,2} & 0 & n_{k,1} & 0 \\ 0 & p_{k,1}-p_{k,2} & -s_k & i \cdot n_{k,2} & 0 & p_{k,1}+p_{k,2} & 0 & n_{k,1} \\ i \cdot n_{k,2} & -s_k^* & -p_{k,1}+p_{k,2} & 0 & n_{k,1} & 0 & p_{k,1}+p_{k,2} & 0 \\ s & i \cdot n_{k,2} & 0 & -p_{k,1}+p_{k,2} & 0 & n_{k,1} & 0 & p_{k,1}+p_{k,2} \end{bmatrix}$$

wherein $p_{k,1}$, $p_{k,2}$, $n_{k,1}$ and $n_{k,2}$ are real-valued functions of the elements of said channel matrix $H_k$ and wherein $s_k$ is a complex-valued function of the elements of said channel matrix $H_k$.

13. The apparatus according to claim 12, wherein said calculation module is configured to calculate said respective channel quality indicator $q_k$ for at least one of said K transmission channels as a function of $(4 \cdot p_{k,1} \cdot p_{k,2}+(p_{k,1}+p_{k,2})(a^2+2 \cdot a)+n_{k,1}^2-n_{k,2}^2+|s_k|^2)^4$, and wherein a is a constant value.

14. The apparatus according to claim 9, wherein said equivalent channel correlation matrix $R_k$ is of the form $$R_k = \begin{bmatrix} p_{k,1}+p_{k,2} & 0 & p_{k,1}-p_{k,2} & s_k \\ 0 & p_{k,1}+p_{k,2} & s_k^* & p_{k,2}-p_{k,1} \\ p_{k,1}-p_{k,2} & s_k & p_{k,1}+p_{k,2} & 0 \\ s_k^* & p_{k,2}-p_{k,1} & 0 & p_{k,1}+p_{k,2} \end{bmatrix},$$

wherein $p_{k,1}$ and $p_{k,2}$ are real-valued functions of the elements of said channel matrix $H_k$ and wherein $s_k$ is a complex-valued function of the elements of said channel matrix $H_k$.

15. The apparatus according to claim 14, wherein said calculation module is configured to calculate said respective channel quality indicator $q_k$ for at least one of said K transmission channels as a function of (det $(aI+H_k^H H_k)$), and wherein a is a constant value.

16. The apparatus according to claim 4, wherein said non-orthonormal matrix modulation is non-orthonormal matrix modulation that maps a block of 4 data symbols onto $N_{t,k}=4$ transmission interfaces in 4 units of said at least one orthogonal domain and is based on the non-orthonormal combination of two space-time transmit diversity codes.

17. The apparatus according to claim 4, wherein said non-orthonormal matrix modulation is a non-orthonormal matrix modulation that maps a block of 8 data symbols onto $N_{t,k}=4$ transmission interfaces in 4 units of said at least one orthogonal domain and is based on the non-orthonormal combination of four space-time transmit diversity codes.

18. The apparatus according to claim 4, wherein said non-orthonormal matrix modulation is a non-orthonormal matrix modulation that maps a block of 4 data symbols onto $N_{t,k}=2$ transmission interfaces in 2 units of said at least one orthogonal domain and is based on the non-orthonormal combination of two space-time transmit diversity codes.

19. The apparatus according to claim 4, wherein said non-orthonormal matrix modulation is a non-orthonormal matrix modulation that maps a block of 4 data symbols onto $N_{t,k}=4$ transmission interfaces in 2 units of said at least one orthogonal domain and is based on the non-orthonormal combination of two space-time transmit diversity codes.

20. The apparatus according to claim 4, wherein said non-orthonormal matrix modulation comprises space-time or space-frequency coding.

21. The apparatus according to claim 4, wherein said non-orthonormal matrix modulation comprises a combination of at least two orthonormal matrix modulations.

22. The apparatus according to claim 4, wherein said scheduler is configured to schedule a transmission channel $k=1, \ldots, K$ with the largest channel quality indicator $q_k$ for said transmission of said data symbols.

23. The apparatus according to claim 4, wherein said transmission channels are transmission channels of a wireless communication system, and wherein said transmission and reception interfaces of said transmission channels are the transmit and receive antenna elements of one or several transmitters and one or several receivers, respectively.

24. A transmitting station in a wireless communication system, comprising an apparatus according to claim 4.

25. A method comprising:
calculating a respective channel quality indicator $q_k$ for at least one of K transmission channels $k=1, \ldots, K$, wherein each transmission channel k has respective $N_{t,k}$ transmission interfaces and resrective $N_{r,k}$ reception interfaces and is defined by a respective channel matrix $H_k$, wherein at least two data symbols are transmitted in rarallel from $N_{t,k}$ transmission interfaces of at least one of said K transmission channels, and wherein at least one of said respective channel quality indicators $q_k$ is calculated as a function of the determinant of a linear function of a channel correlation matrix $H_k^H \cdot H_k$ of said channel matrix $H_k$, and
scheduling at least one of said K transmission channels for the transmission of said data symbols, wherein said scheduling is at least partially based on said calculated channel quality indicators $q_k$.

26. A computer program product comprising a computer program with instructions stored in a memory, said instructions operable to cause a processor to perform the method of claim 25.

27. An apparatus comprising:
a calculation module for calculating a respective channel quality indicator $q_k$ for at least one of K transmission channels $k=1, \ldots, K$, wherein each transmission channel k has respective $N_{t,k}$ transmission interfaces and respective $N_{r,k}$ reception interfaces and is defined by a respective channel matrix $H_k$, wherein at least two data symbols are transmitted in parallel from $N_{t,k}$ transmission interfaces of at least one of said K transmission channels, and wherein at least one of said respective channel quality indicators $q_k$ is calculated as a function of the determinant of a linear function of a channel correlation matrix $H_k^H \cdot H_k$ of said channel matrix $H_k$, and a scheduler for scheduling at least one of said K transmission channels for the transmission of said data symbols, wherein said scheduling is at least partially based on said calculated channel quality indicators $q_k$.

28. A transmitting station in a wireless communication system comprising an apparatus according to claim 27.

29. An apparatus comprising:
- means for calculating a respective channel quality indicator $q_k$ for at least one of said K transmission channels k=1, ... ,K with resrective $N_{t,k}$ transmission interfaces and resrective $N_{r,k}$ reception interfaces, and
- means for scheduling at least one of said K transmission channels for the transmission of data symbols modulated according to a non-orthonormal matrix modulation that modulates data symbols in both a non-orthogonal spatial domain and at least one orthogonal domain, wherein at least one equivalent channel matrix $G_k$ can be defined that transforms said data symbols into data symbols that have been matrix modulated, transmitted over $N_{t,k}$ transmission interfaces and received at $N_{r,k}$ reception interfaces of one of said transmission channels k=1, ... ,K, wherein an equivalent channel correlation matrix $R_k = G_k^H \cdot G_k$ of said at least one equivalent channel matrix $G_k$ is not proportional to the identity matrix, and wherein said scheduling is at least partially based on said calculated channel quality indicators $q_k$.

30. An apparatus comprising:
- means for calculating a respective channel quality indicator $q_k$ for at least one of K transmission channels k=1, ... ,K, wherein each transmission channel k has respective $N_{t,k}$ transmission interfaces and respective $N_{r,k}$ reception interfaces and is defined by a respective channel matrix $H_k$, wherein at least two data symbols are transmitted in parallel from $N_{t,k}$ transmission interfaces of at least one of said K transmission channels, and wherein at least one of said respective channel quality indicators $q_k$ is calculated as a function of the determinant of a linear function of a channel correlation matrix $H_k^H \cdot H_k$ of said channel matrix $H_k$, and
- means for scheduling at least one of said K transmission channels for the transmission of said data symbols, wherein said scheduling is at least partially based on said calculated channel quality indicators $q_k$.

* * * * *

UNITED STATES PATENT AND TRADEMARK OFFICE
CERTIFICATE OF CORRECTION

PATENT NO. : 7,583,745 B2
APPLICATION NO. : 10/581509
DATED : September 1, 2009
INVENTOR(S) : Pasanen et al.

It is certified that error appears in the above-identified patent and that said Letters Patent is hereby corrected as shown below:

1. At column 26, line 23, claim 4, line 19, please delete the phrase "said matrix modulated data symbols".

2. At column 29, line 13, claim 29, line 5, please remove the word "resrective" and replace it with --respective--.

Signed and Sealed this

Third Day of November, 2009

David J. Kappos
*Director of the United States Patent and Trademark Office*